(12) United States Patent
Ladouceur et al.

(10) Patent No.: US 9,160,823 B2
(45) Date of Patent: Oct. 13, 2015

(54) HANDHELD ELECTRONIC DEVICE THAT HAS A KEYPAD WHICH CAN BE RENDERED INEFFECTIVE, AND ASSOCIATED METHOD

(71) Applicant: BLACKBERRY LIMITED, Waterloo (CA)

(72) Inventors: Norman Miner Ladouceur, Wingham (CA); Jason Tyler Griffin, Kitchener (CA)

(73) Assignee: BlackBerry Limited, Waterloo (CA)

( * ) Notice: Subject to any disclaimer, the term of this patent is extended or adjusted under 35 U.S.C. 154(b) by 86 days.

(21) Appl. No.: 14/024,752

(22) Filed: Sep. 12, 2013

(65) Prior Publication Data

US 2014/0024308 A1    Jan. 23, 2014

Related U.S. Application Data

(63) Continuation of application No. 13/471,904, filed on May 15, 2012, now Pat. No. 8,547,254, which is a continuation of application No. 11/944,708, filed on Nov. 26, 2007, now Pat. No. 8,199,032.

(51) Int. Cl.
| | |
|---|---|
| *H03M 11/00* | (2006.01) |
| *H03K 17/94* | (2006.01) |
| *H04M 1/00* | (2006.01) |

(Continued)

(52) U.S. Cl.
CPC ........... *H04M 1/0241* (2013.01); *G06F 3/0213* (2013.01); *G06F 3/0221* (2013.01); *G06F 3/0237* (2013.01); *G06F 3/044* (2013.01); *H04M 1/233* (2013.01); *H04M 1/677* (2013.01); *H04M 1/72522* (2013.01)

(58) Field of Classification Search
USPC ............................. 341/22–34; 345/168–184; 379/368–370; 200/5 A–5 EB
See application file for complete search history.

(56) References Cited

U.S. PATENT DOCUMENTS 7,248,867 B2 *  7/2007  Strawn .......................... 455/423
7,725,127 B2    5/2010  Hawkins et al.
(Continued)

FOREIGN PATENT DOCUMENTS

| EP | 0792054 A2 | 8/1997 |
| EP | 1414220 A2 | 4/2004 |

(Continued)

OTHER PUBLICATIONS

European Patent Application No. 07121533.9-1858 Office Action dated Jul. 24, 2013.
(Continued)

*Primary Examiner* — Firmin Backer
*Assistant Examiner* — Jerold Murphy
(74) *Attorney, Agent, or Firm* — Louis B. Allard; Borden Ladner Gervais LLP

(57) ABSTRACT

An improved handheld electronic device is movable among a retracted configuration and a deployed configuration. Several different exemplary embodiments are described, some having two members, others having more. In one embodiment, certain features or objects are unavailable in a retracted configuration but are available in a deployed configuration or an overtravel configuration. A method of responding to predetermined events comprises detecting a movement of a handheld electronic device away from a first configuration toward a second configuration without reaching the second configuration.

17 Claims, 18 Drawing Sheets

(51) Int. Cl.
*H04M 3/00* (2006.01)
*H04M 1/02* (2006.01)
*G06F 3/02* (2006.01)
*G06F 3/023* (2006.01)
*G06F 3/044* (2006.01)
*H04M 1/23* (2006.01)
*H04M 1/677* (2006.01)
*H04M 1/725* (2006.01)

(56) References Cited

U.S. PATENT DOCUMENTS

| | | | |
|---|---|---|---|
| 7,786,901 B2 * | 8/2010 | Alberth et al. | 341/24 |
| 8,199,032 B2 * | 6/2012 | Ladouceur et al. | 341/22 |
| 8,547,254 B2 * | 10/2013 | Ladouceur et al. | 341/34 |
| 2004/0067784 A1 | 4/2004 | Kubo et al. | |
| 2004/0203520 A1 | 10/2004 | Schirtzinger et al. | |
| 2005/0125570 A1 * | 6/2005 | Olodort et al. | 710/15 |
| 2006/0053847 A1 | 3/2006 | Taki et al. | |
| 2006/0250472 A1 | 11/2006 | Lapstun et al. | |

FOREIGN PATENT DOCUMENTS

| | | |
|---|---|---|
| EP | 1489819 A1 | 12/2004 |
| EP | 1601165 A1 | 11/2005 |
| GB | 2347894 A | 9/2000 |
| WO | 2007/057056 A1 | 5/2007 |
| WO | 2007/100023 A1 | 9/2007 |

OTHER PUBLICATIONS

U.S. Appl. No. 11/944,708, Notice of Allowance dated Feb. 17, 2012.
U.S. Appl. No. 13/471,904, Notice of Allowance dated May 29, 2013.
European Patent Application No. 07121533.9-2414, European Search Report dated May 28, 2008.
European Patent Application No. 07121533.9, Office Action dated Feb. 24, 2010.

\* cited by examiner

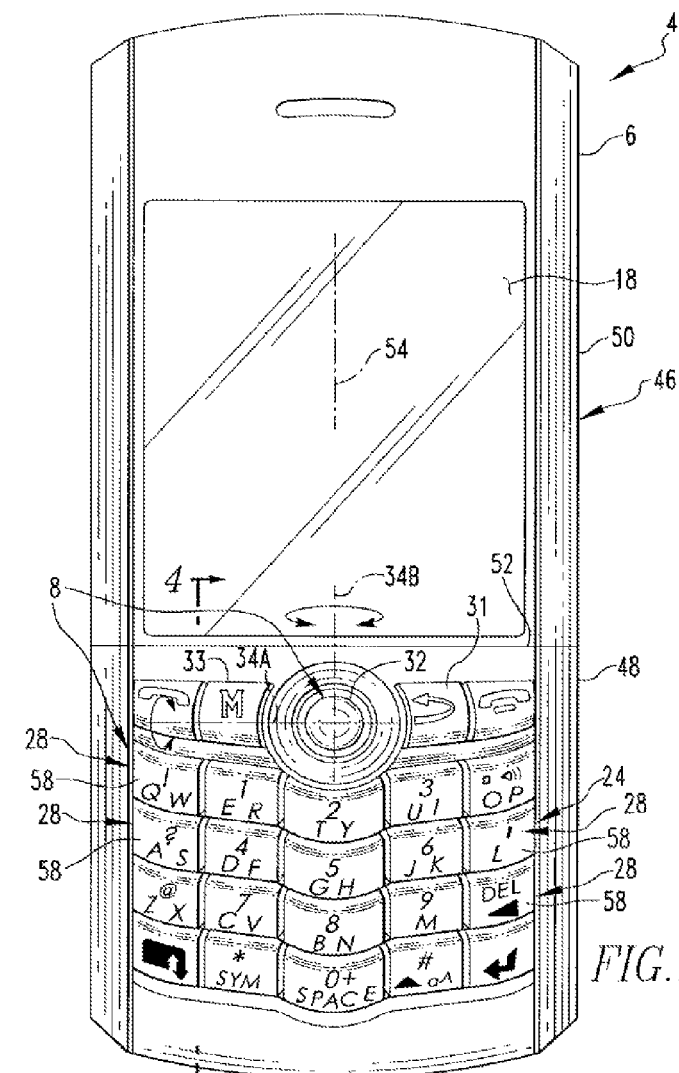
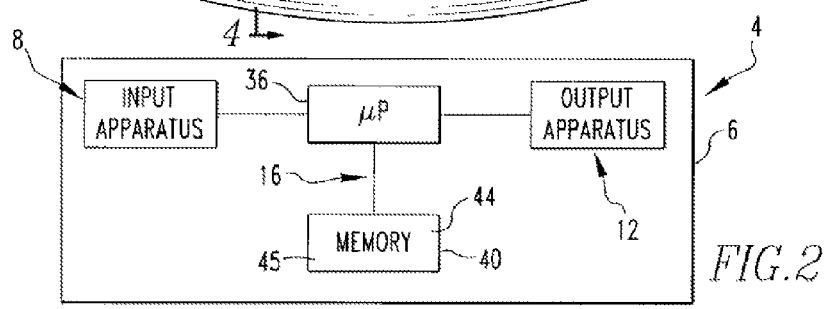
FIG.1
FIG.2

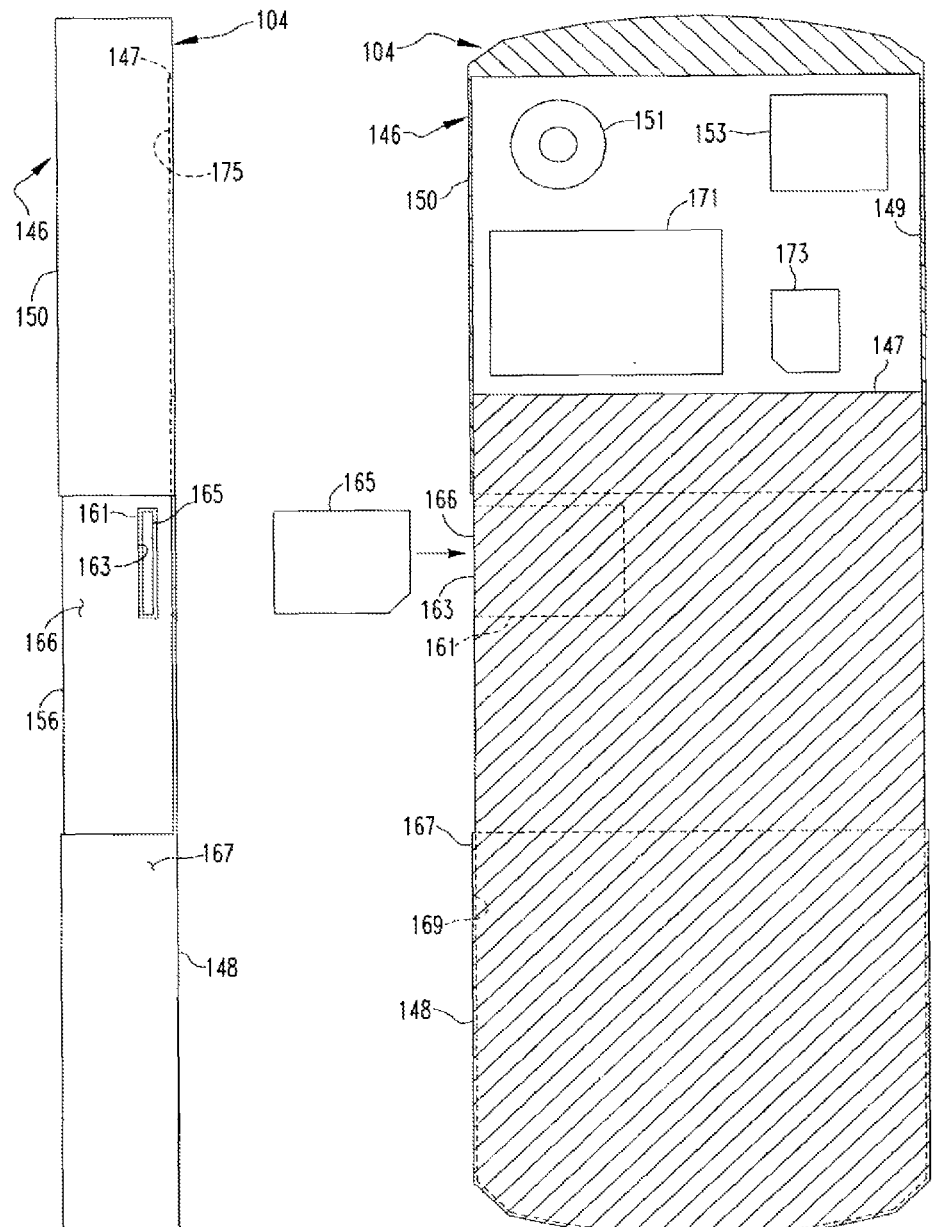

HANDHELD ELECTRONIC DEVICE THAT HAS A KEYPAD WHICH CAN BE RENDERED INEFFECTIVE, AND ASSOCIATED METHOD

FIELD

The disclosed and claimed concept relates generally to handheld electronic devices and, more particularly, to a handheld electronic device and method that enable a keypad to be rendered ineffective.

BACKGROUND INFORMATION

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

While handheld electronic devices have been generally effective for their intended purposes, such handheld electronic devices have not, however, been without limitation. The portable nature of handheld electronic devices can result in certain shortcomings with handheld electronic devices that typically do not exist with, for example, desktop devices. For instance, the keys of a handheld electronic device can inadvertently be actuated when such a device is carried, for instance, in a pocket or a purse. Similarly, objects such as memory cards and other items that can be carried on or in a handheld electronic device can be lost if the device is dropped. It thus would be desired to provide an improved handheld electronic device and/or method that overcome these and other shortcomings.

BRIEF DESCRIPTION OF THE DRAWINGS

A full understanding of the disclosed and claimed concept can be gained from the following Description when read in conjunction with the accompanying drawings in which:

FIG. 1 is a front elevational view of an improved handheld electronic device in accordance with a first embodiment of the disclosed and claimed concept in a retracted configuration;

FIG. 2 is a schematic depiction of the handheld electronic device of FIG. 1;

FIG. 11 is a view similar to FIG. 9, except depicting the handheld electronic device in an overtravel configuration;

FIG. 12 is a view similar to FIG. 10, except depicting the handheld electronic device in an overtravel configuration;

Similar numerals refer to similar parts throughout the specification.

DESCRIPTION

Figure 3:
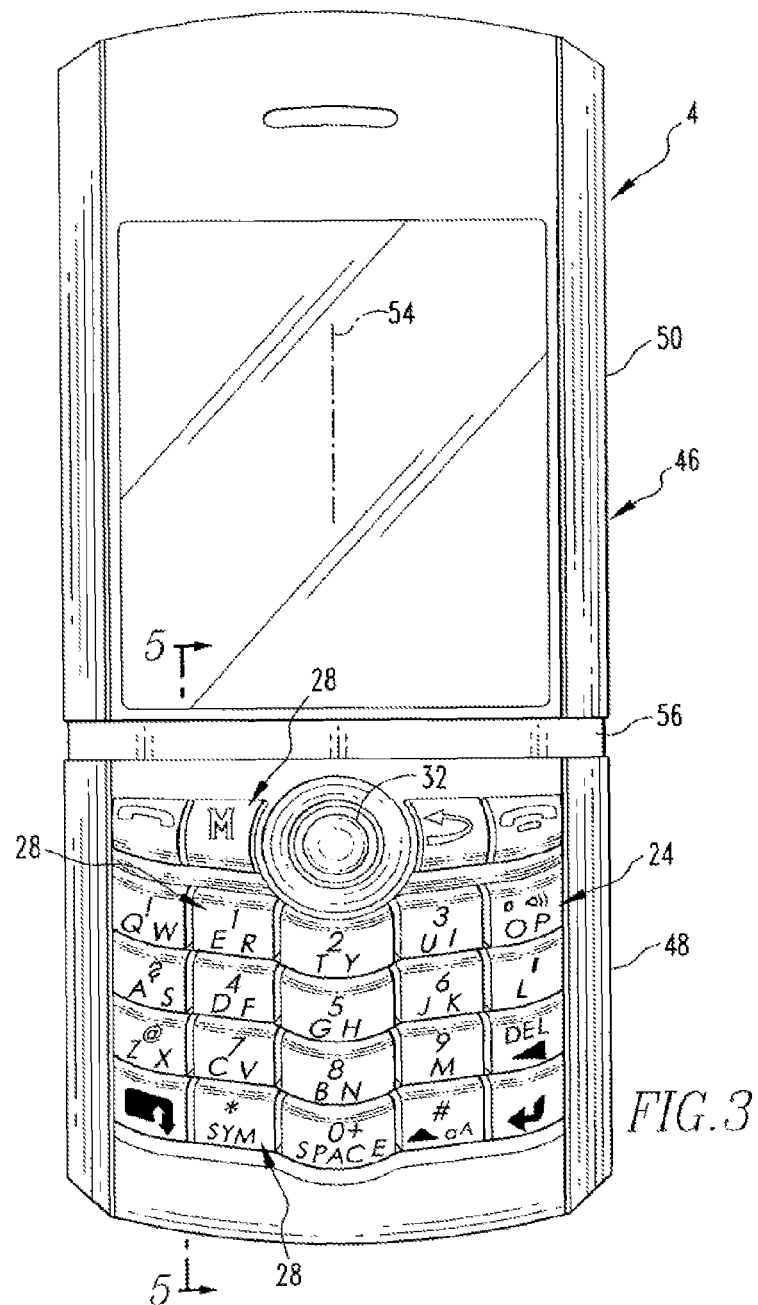
FIG. 3 is a front elevational view of the handheld electronic device of FIG. 1 in a deployed configuration.

An improved handheld electronic device 4 is indicated generally in FIG. 1 and is depicted schematically in FIG. 2. The exemplary handheld electronic device 4 includes a housing 6 upon which are disposed an input apparatus 8, an output apparatus 12, and a processor apparatus 16. The input apparatus 8 is structured to provide input to the processor apparatus 16, and the output apparatus 12 is structured to receive output signals from the processor apparatus 16. The output apparatus 12 comprises a display 18 that is structured to provide visual output, although other output devices such as speakers, LEDs, tactile output devices, and so forth can be additionally or alternatively used.

As can be seen in FIG. 2, the processor apparatus 16 comprises a processor 36 and a memory 40. The processor 36 may be, for instance and without limitation, a microprocessor (μP) that is responsive to inputs from the input apparatus 8 and that provides output signals to the output apparatus 12. The processor 36 interfaces with the memory 40.

The memory 40 can be said to constitute a machine-readable medium and can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 40 has stored therein a number of routines 44 which are executable on the processor 36. As employed herein, the expression "a number of" and variations thereof shall refer broadly to any non-zero quantity, including a quantity of one. The routines 44 can be in any of a variety of forms such as, without limitation, software, firmware, and the like. The memory 40 also has stored therein a dictionary and other linguistic data sources that are used by a disambiguation routine 44 to provide responses to ambiguous text inputs.

As can be understood from FIG. 1, the input apparatus 8 includes a keypad 24 and a multiple-axis input device which, in the exemplary embodiment depicted herein, is a track ball 32 that will be described in greater detail below. The keypad 24 comprises a plurality of keys 28 in the exemplary form of a reduced QWERTY keyboard, meaning that at least some of the keys 28 each have a plurality of characters assigned thereto, with at least some of the characters being Latin letters arranged generally in a QWERTY arrangement. The keys 28 and the track ball 32 all serve as input members that are actuatable to provide input to the processor apparatus 16. The keypad 24 and the track ball 32 are advantageously disposed adjacent one another on a front face of the housing 6. This enables a user to operate the track ball 32 substantially without moving the user's hands away from the keypad 24 during a text entry operation or other operation.

Figure 21:
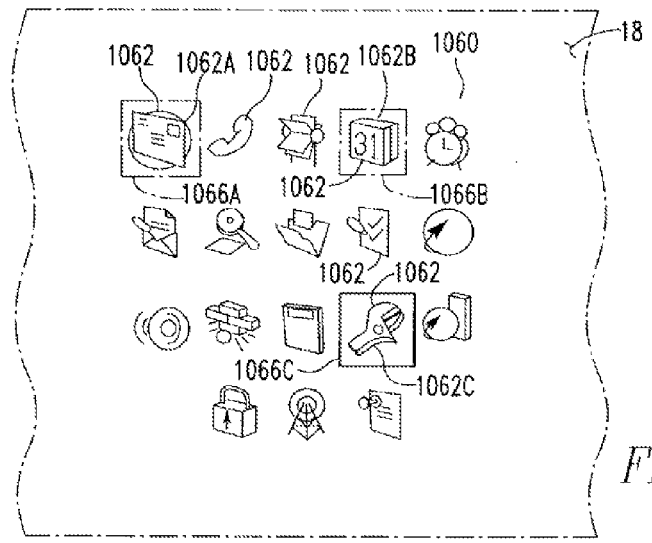
FIG. 21 is an exemplary home screen that can be visually output on a handheld electronic device.

One of the keys 28 is an <ESCAPE> key 31 which, when actuated, provides to the processor apparatus 16 an input that undoes the action which resulted from the immediately preceding input and/or moves the user to a logically higher position within a logical menu tree managed by a graphical user interface (GUI) routine 44. The function provided by the <ESCAPE> key 31 can be used at any logical location within any portion of the logical menu tree except, perhaps, at a home screen such as is depicted in FIG. 21. The <ESCAPE> key 31 is advantageously disposed adjacent the track ball 32 thereby enabling, for example, an unintended or incorrect input from the track ball 32 to be quickly undone, i.e., reversed, by an actuation of the adjacent <ESCAPE> key 31.

Figure 9:
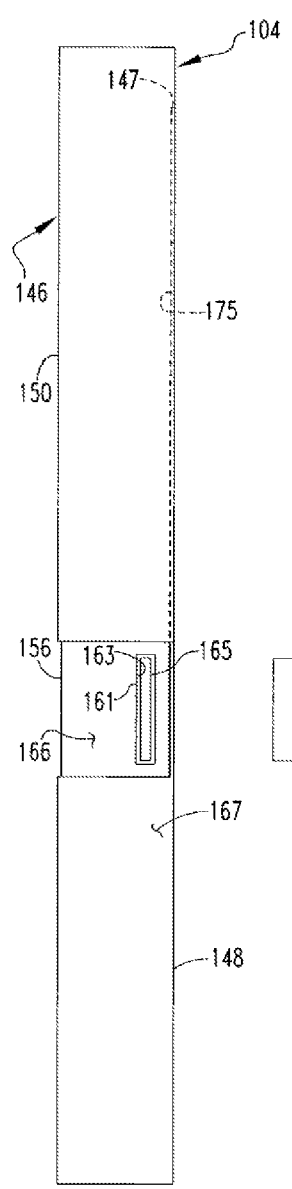
FIG. 9 is a side elevational view of the handheld electronic device of FIG. 8.

Another of the keys 28 is a <MENU> key 33 which, when actuated, provides to the processor apparatus 16 an input that causes the GUI 44 to generate and output on the display 18 a menu such as is depicted in FIG. 9. Such a menu is appropriate to the user's current logical location within the logical menu tree, as will be described in greater detail below.

While in the depicted exemplary embodiment the multiple-axis input device is the track ball 32, it is noted that multiple-axis input devices other than the track ball 32 can be employed without departing from the present concept. For instance, other appropriate multiple-axis input devices could include mechanical devices such as joysticks and the like and/or non-mechanical devices such as touch pads, track pads and the like and/or other devices which detect motion or input in other fashions, such as through the use of optical sensors or piezoelectric crystals.

The track ball 32 is freely rotatable in all directions with respect to the housing 6. A rotation of the track ball 32 a predetermined rotational distance with respect to the housing 6 provides an input to the processor apparatus 16, and such inputs can be employed by the routines 44, for example, as navigational inputs, scrolling inputs, selection inputs, and other inputs.

For instance, and as can be seen in FIG. 1, the track ball 32 is rotatable about a horizontal axis 34A to provide vertical scrolling, navigational, selection, or other inputs. Similarly, the track ball 32 is rotatable about a vertical axis 34B to provide horizontal scrolling, navigational, selection, or other inputs. Since the track ball 32 is freely rotatable with respect to the housing 6, the track ball 32 is additionally rotatable about any other axis (not expressly depicted herein) that lies within the plane of the page of FIG. 1 or that extends out of the plane of the page of FIG. 1.

The track ball 32 can be said to be a multiple-axis input device because it provides scrolling, navigational, selection, and other inputs in a plurality of directions or with respect to a plurality of axes, such as providing inputs in both the vertical and the horizontal directions. It is reiterated that the track ball 32 is merely one of many multiple-axis input devices that could be employed on the handheld electronic device 4. As such, mechanical alternatives to the track ball 32, such as a joystick, might have a limited rotation with respect to the housing 6, and non-mechanical alternatives might be immovable with respect to the housing 6, yet all are capable of providing input in a plurality of directions and/or along a plurality of axes.

The track ball 32 additionally is translatable toward the housing 6, i.e., into the plane of the page of FIG. 1, to provide additional inputs. The track ball 32 could be translated in such a fashion by, for example, a user applying an actuating force to the track ball 32 in a direction toward the housing 6, such as by pressing on the track ball 32. The inputs that are provided to the processor apparatus 16 as a result of a translation of the track ball 32 in the indicated fashion can be employed by the routines 44, for example, as selection inputs, delimiter inputs, or other inputs.

The handheld electronic device 4 can be said to be in the form of a body 46 having a bottom member 48 and a top member 50. That is, the housing 6, the input apparatus 8, the output apparatus 12, the processor apparatus 16, and the like can be said to together form the body 46 and are thus distributed among the bottom and top members 48 and 50 in the depicted exemplary embodiment.

The body 46 is movable between a retracted configuration, such as is depicted generally in FIG. 1, and a deployed configuration, such as is depicted generally in FIG. 3. The bottom and top members 48 and 50 are translatable along a direction of travel between the retracted and deployed configurations. The direction of travel is represented by the axis 54, and it is noted that the bottom and top members 48 and 50 translate with respect to one another in opposite directions along the axis 54 when moving between the retracted and deployed configurations. In the retracted configuration, the bottom and top members 48 and 50 at least partially abut one another at a parting line 52. However, when the body 46 is moved away from the retracted configuration toward the deployed configuration, the edges of the bottom and top members 48 and 50 that had abutted one another at the parting line 52 are moved away from one another to reveal a retracting portion 56 which, in the present exemplary embodiment, is a part of the top member 50.

In the exemplary embodiment depicted herein, the keypad 24 is disabled in the retracted configuration and is active in the deployed configuration. As can be understood from FIGS. 4 and 5, each key 28 comprises an actuator 58 and an associated collapsible dome 60 disposed on a printed circuit board 62 of the body 46. Each actuator is movable between an unactuated position and an actuated position. In the actuated position, the actuator 58 engages the associated collapsible dome 60 and collapses it against the printed circuit board 62 to electrically connect together at least a pair of contacts on the printed circuit board 62 to complete a circuit. Each dome 60, in combination with the contacts of the printed circuit board 62 that it can electrically connect together, can be said to comprise a switch that is actuated by the actuator 58.

Figure 5:
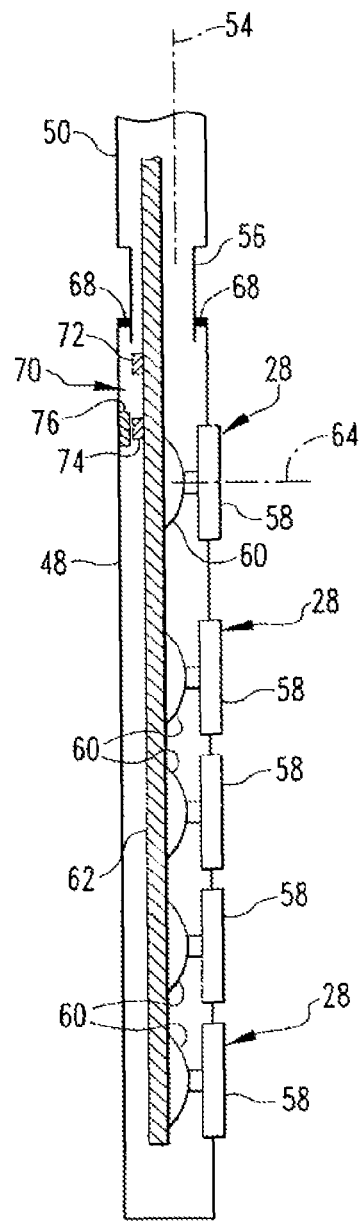
FIG. 5 is a sectional view as taken along line 5-5 of FIG. 3.

In the deployed configuration depicted generally in FIG. 5, the actuators are each aligned with their associated collapsible domes 60 along a direction of actuation of the keys 28 such as is represented by the axis 64. As such, an actuation of one of the actuators 58 in the deployed configuration will result in the completion of a circuit that includes the associated collapsible dome 60, with the completion of the circuit being detected as an input to the processor 36. However, in the retracted configuration the actuators 58 are offset from their associated collapsible domes 60 such that an actuating movement of an actuator 58 will not result in the associated dome 60 being engaged, being collapsed, or completing a circuit. That is, the actuators 58 are offset from their associated domes 60 by not being aligned therewith along the direction of actuation 64. In such a situation the actuators 58 can be said to be offset generally in the direction of travel 54, for example. As such, the keys 28 in the retracted configuration are disabled.

In the exemplary embodiment depicted herein, such disabling in the retracted configuration is accomplished by disposing the actuators 58 on the bottom member 48 and by disposing the domes 60 on the top member 50, i.e., on the printed circuit board 62. Thus, since at least one of the bottom and top members 48 and 50 moves with respect to the other of the bottom and top members 48 and 50 in moving the body 46 between the retracted and deployed configurations, the actuators 58 and associated domes 60 are movable between the offset, i.e., disabled, condition and the aligned, i.e., enabled, condition, respectively. A similar result could occur if, for instance, in the retracted configuration a structure resisted actuating movements of the actuators 58 and/or collapsing movements of the domes 60, for example.

Alternatively, the keys 28 can be disabled through the use of a routine 44 executed on the processor 36. For example, the keys 28 might alternatively be arranged to at all times have their actuators aligned with their associated domes, but the resulting inputs to the processor 36 would be ignored, i.e., not acted upon, if the body 46 is in the retracted configuration. This could be effected through the use of the aforementioned routine 44 and an input from a sensor apparatus 70 that provides an indication whether the handheld electronic device 4 is in the retracted configuration, the deployed configuration, or neither such configuration.

The exemplary sensor apparatus comprises a pair of Hall Effect sensors 72 and 74 and a magnet 76. The Hall Effect sensors 72 and 74 can be disposed, for example, on the printed circuit board 62, and the magnet 76 can be disposed, for example on a portion of the bottom member 48. In the retracted configuration, such as in FIG. 4, the Hall Effect sensor 72 would be aligned with and would detect the magnet 76 and would therefore provide an input to the processor 36 which would be interpreted by routine 44 running on the processor 36 as being indicative of the body 46 being in the retracted configuration. In the deployed configuration, the Hall Effect sensor 74 would be aligned with the magnet 76 and would provide to the processor 36 an input indicative of the body 46 being in the deployed configuration. Such a system could be implemented in the handheld electronic device 4 in place of the differential positioning of the actuators 58 and the domes 60 without departing from the present concept.

Figure 6:
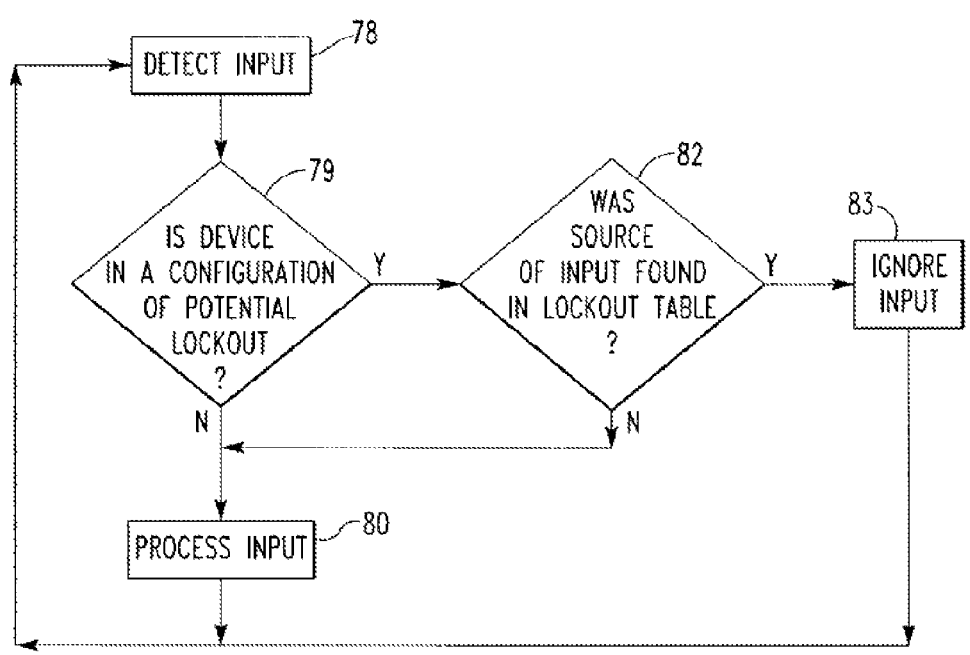
FIG. 6 is a flowchart depicting portions of an improved method in accordance with the disclosed and claimed concept.

An exemplary flowchart depicted in FIG. 6 describes such a method. Processing would begin, as at 78, where an input is detected by the processor 36. Processing would thereafter continue, as at 79, where it would be determined whether or not the handheld electronic device 4 is in a configuration of potential lockout. For instance, if the body 46 was in a deployed configuration where the keys 28 are intended to be active, it would be determined at 79 that the device is not in a configuration of potential lockout and processing would thus continue, as at 80, where the input would be processed by the processor 36 in accordance with the routine 44 presently active thereon. Processing could thereafter continue, as at 78, where further inputs could be detected.

However, if it is determined, as at 79, that the device is in a configuration of potential lockout, such as if the sensor apparatus 70 provided input to the processor 36 indicative of the body 46 being in the retracted configuration, processing would continue, as at 82, where it would be determined whether or not the source of the input, i.e., the particular key 28 that was actuated to provide the input, was intended to be locked out in that particular configuration. That is, it may be possible that certain of the keys 28 are to remain active in the retracted configuration while others are deactivated.

The status of a particular key 28 could be determined, for example, by ascertaining whether or not the key 28 is listed in a lockout table stored in the memory 40. Such a lockout table might include a listing of all of the keys 28 whose input is to be ignored in, say, the retracted configuration. If it is determined, as at 82, that the particular source of the input, i.e., the particular key 28 that was actuated, is not found in the lockout table, this would indicate that the key 28 is not intended to be disabled in that particular configuration. Processing would thereafter continue, as at 80, where the input would be processed in the ordinary fashion by the active routine 44. However, if it is determined, as at 82, that the actuated key 28 is found in the lockout table, processing would continue, as at 83, where the input would be ignored. Processing would thereafter continue, as at 78, where additional inputs could be detected.

Figure 4:
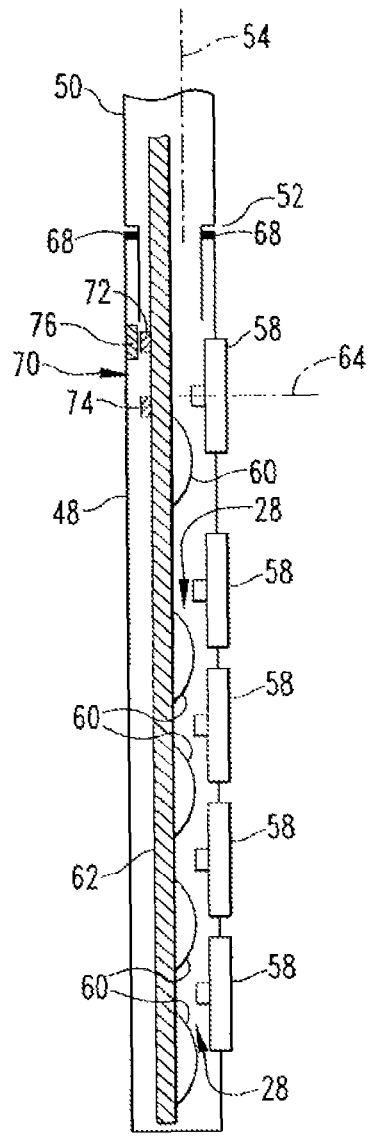
FIG. 4 is a sectional view as taken along line 4-4 of FIG. 1.

It thus can be seen that the handheld electronic device 4 can be arranged such that the keys 28 are incapable of generating an input that can be detected by the processor 36, such as by providing the selective alignment or offsetting of the actuators 58 from their associated domes 60, as is indicated generally in FIGS. 4 and 5. Alternatively, the keys 28 could be arranged to provide inputs that are detectable by the processor 36 but that are ignored by the routine 44 that is active on the processor 36 in a fashion such as is depicted by the flowchart of FIG. 6. While the latter type of arrangement advantageously avoids the need to mechanically disable the keys 28, and rather accomplishes its purpose through the use of software, i.e., a routine 44 that is being executed on the processor 36, such an arrangement nevertheless consumes power by detecting inputs and processing such inputs in accordance with the flowchart of FIG. 6. On the other hand, the mechanical solution presented generally in FIGS. 4 and 5 advantageously does not require the consumption of power in such a fashion.

In either situation, the handheld electronic device 4 can be arranged such that unintended actuations of the keys 28 or other input members can be rendered ineffective. The keys 28 are moved between a deactivated condition and an activated condition by moving the body 46 between the retracted and deployed configurations, respectively. Such a lockout, either mechanical or electronic, is advantageous since the handheld electronic device 4 is unlikely to be unintentionally moved from its retracted configuration to its deployed configuration in a situation such as when the handheld electronic device 4 is being carried in a pocket or a purse. As such, the handheld electronic device 4 has a keypad 24 that can be disabled, in whole or in part, in a fashion that is unlikely to be unintentionally altered. This is further advantageous since a user need not worry or even contemplate whether the keypad 24 is active or is disabled. Rather, the user can simply be aware that the body 46 is, for example, in the retracted configuration of FIG. 1, and that the keypad 24 therefore is, for instance, disabled. That is, any portions of the keypad 24 that are intended to be disabled in the retracted configuration are incapable of being rendered active while the handheld electronic device 4 remains in the retracted configuration.

It thus can be seen that a number of operational characteristics of the handheld electronic device 4 differ between the retracted and deployed configurations. For example, certain of the keys 28 are disabled, i.e., are non-operational, in the retracted configuration but are active, i.e., operational, in the deployed configuration. Similarly, certain routines 44 may be unavailable in the retracted configuration whereas they would be available in the deployed configuration, such as a text entry routine 44 that would be of no use in a retracted configuration if a textual keypad is disabled. However, certain other routines 44 might be available in all configurations of the handheld electronic device 4. For example, a routine 44 that detects the occurrence of an incoming telephone call or other predetermined event and provides a notification to the user may desirably be active at all times on the handheld electronic device 4 regardless of the retracted or deployed configuration thereof. In this regard, an improved method in accordance with the disclosed and claimed concept enables the handheld electronic device 4 to respond in one or more predetermined fashions to predetermined events depending upon configuration.

For example, a user might receive an incoming telephone call but would prefer to ignore the telephone call, i.e., not answer the telephone call, and would also wish to end the outputting of the notification of the incoming telephone call that is provided by the handheld electronic device 4. The handheld electronic device 4 is thus advantageously arranged such that when the handheld electronic device 4 is, for example, in the retracted configuration and an incoming telephone call is received, the incoming telephone call can be ignored and the notification of the incoming call terminated if the user moves the handheld electronic device 4 from the retracted configuration slightly toward the deployed configuration and returns it to the retracted configuration without reaching the deployed configuration during the intervening period of time. A similar result can be achieved in other fashions without the handheld electronic device 4 being required to be returned to the original configuration, i.e., the retracted configuration. For instance, the processor 36 might determine that movement of the body 46 from the retracted configuration toward the deployed configuration has ceased without reaching the deployed configuration. By way of further example, the processor 36 might determine that the body 46 has failed to reach the deployed configuration within a predetermined period of time after the beginning of movement toward the deployed configuration.

Figure 7:
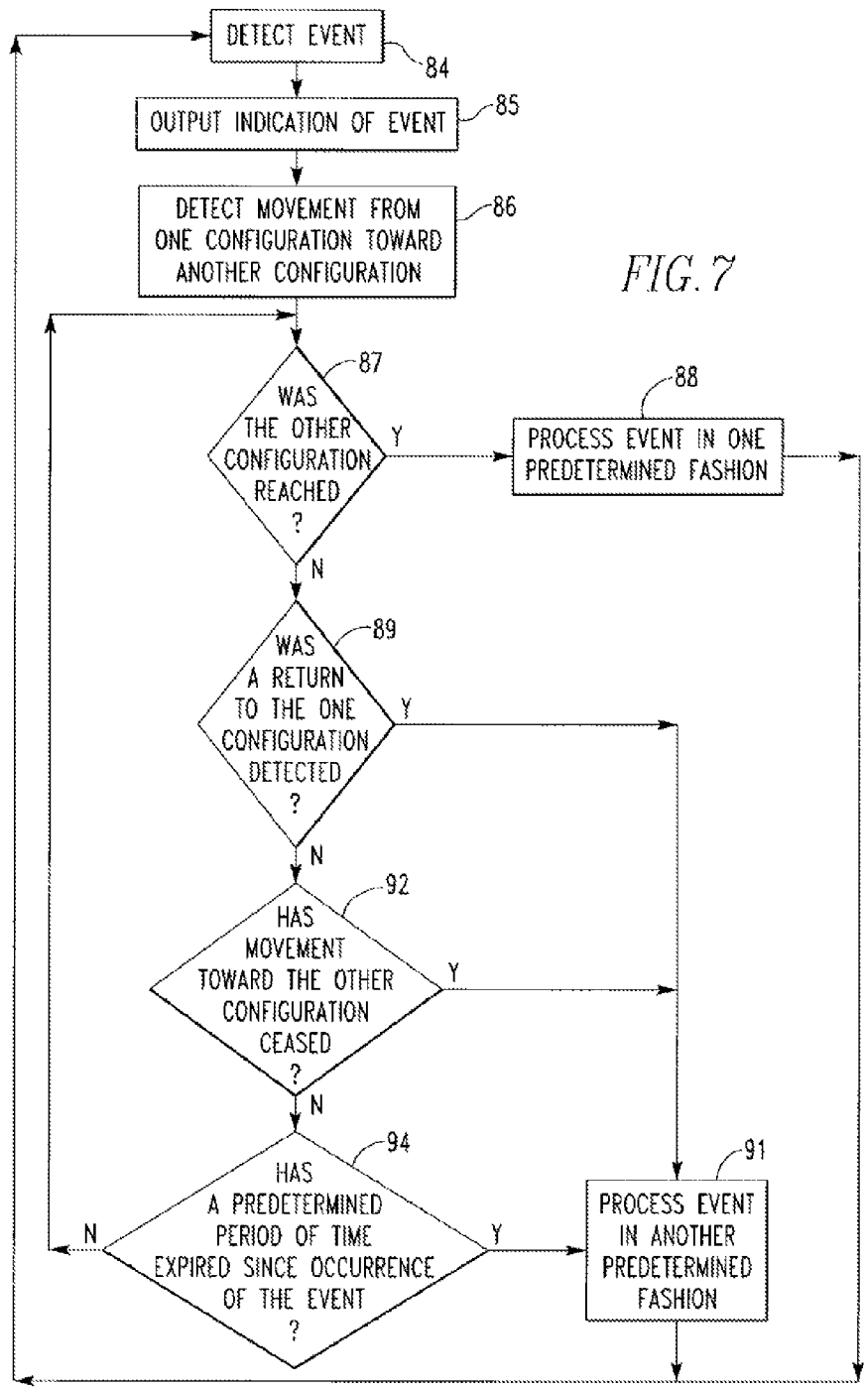
FIG. 7 is another flowchart depicting portions of another improved method in accordance with the disclosed and claimed concept.

FIG. 7 depicts an exemplary flowchart that describes certain aspects of this feature. Processing begins, as at 84, where the occurrence of a predetermined event is detected. Processing thereafter continues, as at 85, where an indication of the event is output, such as audibly or through the use of lights, vibrations, and the like. Processing thereafter continues, as at 86, where the processor 36 detects movement of the body 46 from one configuration toward another configuration, such as could be generated by the sensor apparatus 70.

It is then determined, as at 87, whether the body 46 has reached the other configuration. If so, the predetermined event is processed in a predetermined fashion, such as in the way an incoming telephone call would be processed, i.e., answered, if upon outputting the indication of the incoming call the body 46 was moved from the retracted configuration to the deployed configuration. Processing would thereafter continue, as at 84, where further predetermined events could be detected.

On the other hand, if it is determined, as at 87, that the other configuration has not been reached, processing would continue, as at 89, where it would be determined whether a return of the body 46 to the initial configuration has been detected. If so, processing would continue, as at 91, where the event could be processed in another predetermined fashion, such as in the way an incoming telephone call would be ignored and an audible indication terminated if the user shifted the body 46 slightly from the retracted configuration toward the deployed configuration and back to the retracted configuration without reaching the deployed configuration in the meantime. Processing would thereafter continue, as at 84, where further predetermined events could be detected.

On the other hand, if a return of the body 46 to the initial configuration was not detected, as at 89, processing would continue, as at 92, where it would be determined whether movement toward the other configuration has ceased. If so, processing would continue to 91 where the predetermined event would be processed in the other predetermined fashion. If not, processing would continue, as at 94, where it would be determined whether a predetermined period of time has expired since the predetermined event occurred. If so, processing continues, as at 91, where the predetermined event can be processed in the other predetermined fashion. If not, however, processing returns, as at 87, where the aforementioned decision tree is repeated in a loop-like fashion until the predetermined event is processed in either the one predetermined fashion, as at 88, or in the other predetermined fashion, as at 91. After the predetermined event has been processed, processing continues, as at 84, where other predetermined events can be detected.

It is also noted that a seal 68 is provided between the bottom and top members 48 and 50 to resist the entry of foreign material such as dust, liquids, and moisture. The seal 68 can be designed to seal the junction between the bottom and top members 48 and 50 at all times or could be designed to perform the sealing operation only when, for example, the body 46 is in the retracted configuration.

Figure 8:
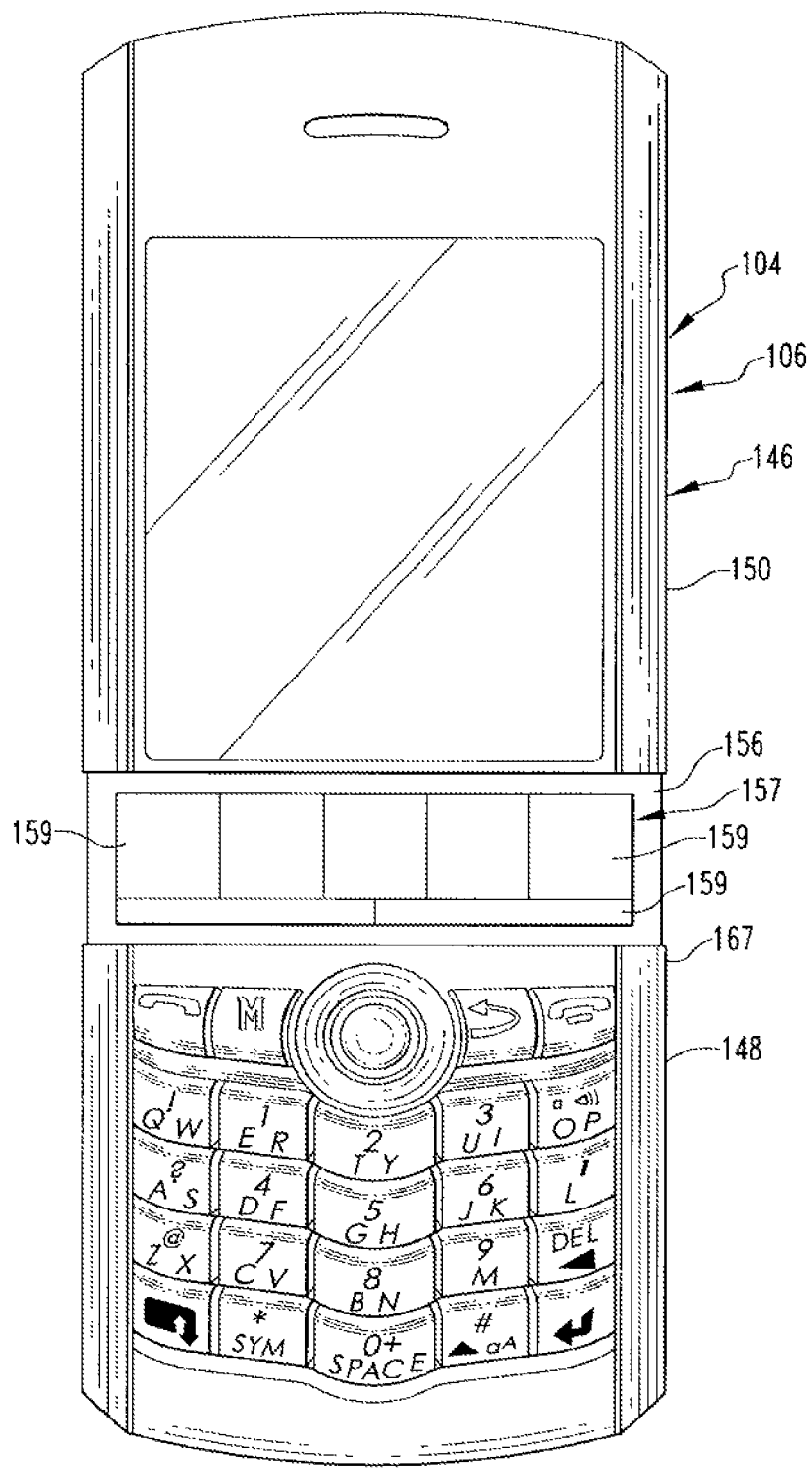
FIG. 8 is a front elevational view of an improved handheld electronic device in accordance with a second embodiment of the disclosed and claimed concept in a deployed configuration.
Figure 10:
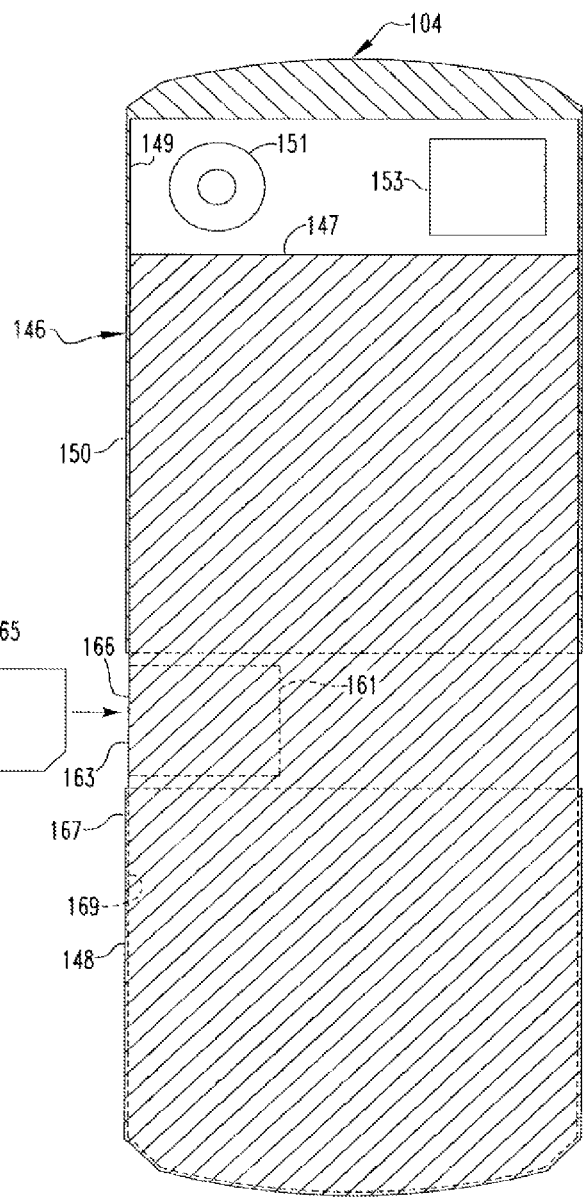
FIG. 10 is a rear elevational view of the handheld electronic device of FIG. 8.
Figure 10A:
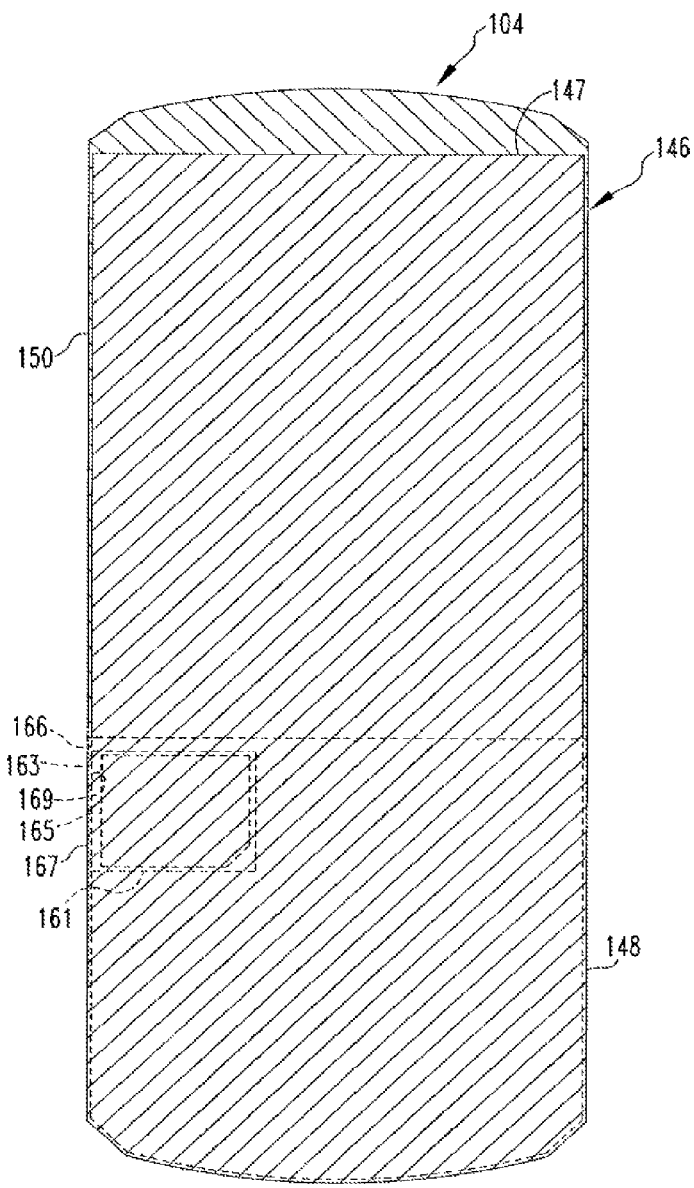
FIG. 10A is a rear elevational view of the handheld electronic device of FIG. 8 in a retracted configuration.

An improved handheld electronic device 104 in accordance with another embodiment of the disclosed and claimed concept is depicted generally in FIGS. 8-12. The handheld electronic device 104 is similar to the handheld electronic device 4 except has a different body 146. The body 146 includes a bottom member 148 having a rear panel 147 that is a component of a housing 106 of the handheld electronic device and movably extends within a recess 149 formed in the rear of a top member 150. In FIGS. 8-10 the handheld electronic device 104 is in a deployed configuration, and it can be seen in FIG. 10 that in the deployed configuration the rear panel 147 has slid within the recess 149 to reveal a camera 151 and a mirror 153, although other components could be provided. FIG. 10A depicts the handheld electronic device 104 in a retracted configuration wherein the camera 151 and mirror 153 are protected behind the rear panel 147 within an interior of the handheld electronic device 104. The camera 151, which has a lens that is intended to collect visible light, and the mirror 153, which is intended to reflect visible light, are advantageously protected from dirt, damage, and the like when the handheld electronic device 104 is in the retracted configuration, although they are exposed and ready for use when the handheld electronic device 104 is in its deployed configuration.

As can be seen in FIG. 8, the handheld electronic device 104 has a retracting portion 156 that is a part of the top member 150 and that is revealed to the atmosphere when the handheld electronic device 104 is in the deployed configuration. It can be understood from FIG. 10A that, as suggested above, the retracting portion 156 is retracted and disposed within the interior of the handheld electronic device 104 when in the retracted configuration.

The retracting portion 156 includes, in the exemplary embodiment depicted herein, a secondary keypad 157 having a number of secondary keys 159. In the exemplary embodiment the secondary keys 159 can operate the camera 151, for instance, and/or perform other functions. That is, the movement of the handheld electronic device 104 from the retracted configuration to the deployed configuration reveals the camera 151, the mirror 153 which can used in conjunction with the camera 151, as well as the secondary keys 159 which operate the camera 151. The handheld electronic device 104 in the deployed configuration thus provides an operational characteristic, i.e., availability of the camera 151, in the deployed configuration but does not make the camera 151 available in the retracted configuration.

The handheld electronic device 104 additionally includes a card holder 161 disposed on the top member 150 and having an opening 163 disposed at a lateral surface 166 of the top member 150. The card holder 161 is arranged to receive a card 165 through the opening 163 into the interior of the card holder 161. The card 165 can be any of a variety of objects that are receivable in the holder 161 and that are removable therefrom in certain circumstances. For instance, the card 165 could be an SD card or other type of card or other device.

More specifically, the card holder 161 could be a PUSH-PUSH card holder or other holder that can receive and retain the card 165 or other object therein when the handheld electronic device 104 is in the deployed configuration, such as is depicted generally in FIGS. 8-10. However, when the handheld electronic device 104 is in the retracted configuration, such as is depicted generally in FIG. 10A, a lateral housing portion 167 of the bottom member 148 extends across the opening 163 of the card holder 161 and therefore resists removal of the card 165 from the holder 161. That is, an interior surface 169 of the lateral housing portion 167 is disposed adjacent the opening 163 to resist removal of the card 165 in the retracted configuration.

The arrangement depicted in FIGS. 8-10A advantageously resists removal of the card 165 or other object received in the holder 161 when the handheld electronic device 104 is in the retracted configuration. Therefore, if the handheld electronic device 104 in the retracted configuration is dropped, such as by falling out of a pocket or a purse, the card 165 is resisted from being removed from the holder 161, and therefore resisted from being unintentionally lost. In the deployed configuration of FIGS. 8-10, however, the card 165 can be readily removed from the card holder 161 or installed therein in an ordinary fashion.

It is anticipated that the handheld electronic device 104 typically will be moved between the retracted and deployed configurations during ordinary use of the handheld electronic device 104. For instance, the handheld electronic device 104 may be disposed in the retracted configuration when the handheld electronic device 104 is being transported or when minimal functionality of the handheld electronic device 104 is needed. The handheld electronic device 104 can be disposed in the deployed configuration when additional operational characteristics of the handheld electronic device 104 are required or when, for instance, access to the card 165, i.e., such as for installation or removal, is required. In accordance with another aspect of the disclosed and claimed concept, however, the handheld electronic device 104 is additionally capable of an overtravel configuration, such as is depicted generally in FIGS. 11 and 12. In the exemplary embodiment depicted herein, the overtravel configuration is a configuration beyond the deployed configuration. That is, in moving from the retracted configuration to the deployed configuration, the bottom and top members 148 and 150 are moved in a certain direction, i.e., generally away from one another. The handheld electronic device is moved from the deployed configuration to the overtravel configuration by continuing to move the bottom and top members 148 and 150 in the same direction, i.e., farther away from one another.

As can be seen in FIGS. 11 and 12, in the overtravel configuration the rear panel 147 has moved sufficiently within the recess 149 of the top member 150 to reveal, for example, a battery 171 and SIM card 173 to which the user now has access. That is, the battery 171 and the SIM card 173 are objects that can be installed and/or removed from the handheld electronic device 104 in the overtravel configuration but to which the user does not access when the handheld electronic device 104 is in the deployed or retracted configurations.

In this regard, it is understood that access to the battery 171 and/or the SIM card 173 or other objects is typically unnecessary during ordinary use of the handheld electronic device 104, but access to such objects can be provided if needed. In this regard, the handheld electronic device 104 might be arranged such that movement of the handheld electronic device 104 past the deployed configuration to the overtravel configuration is resisted through the use of detents that require more force to overcome than the force required to move the handheld electronic device between the retracted and deployed configurations. Additionally or alternatively, movement of the handheld electronic device to the overtravel configuration can be protected in other fashions, such as through the use of a password that might be required to be entered on the handheld electronic device 104 or a special key that might be applied to the handheld electronic device 104 or other security measure complied with. As such, the handheld electronic device 104 can be arranged such that the user does not have access to objects such as the battery 171 and the SIM card 173 without the assistance of, for example, a system administrator or other individual.

As can be understood from FIGS. 9-12, the battery 171 and the SIM card 173 are retained within the interior of the handheld electronic device 104 by the rear panel 147. Specifically, in the deployed configuration an interior surface 175 of the rear panel 147 is disposed adjacent the battery 171 and/or the SIM card 173 and/or their sockets or receptacles when empty. In the retracted configuration, the interior surface 175 overlies the camera 151 and mirror 153 to similarly retain these items within the interior of the handheld electronic device 104 in the retracted configuration.

Figure 13:
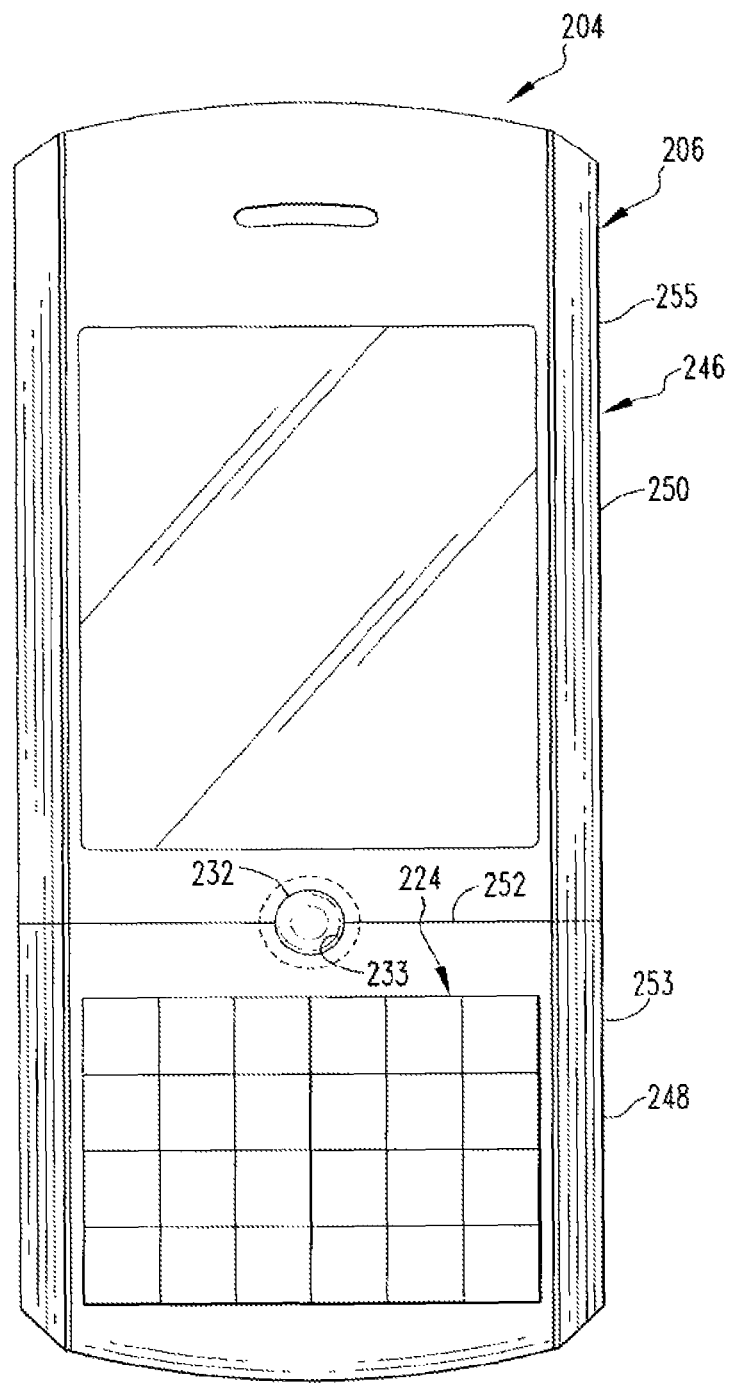
FIG. 13 is a front elevational view of an improved handheld electronic device in accordance with a third embodiment of the disclosed and claimed concept in a retracted configuration.
Figure 14:
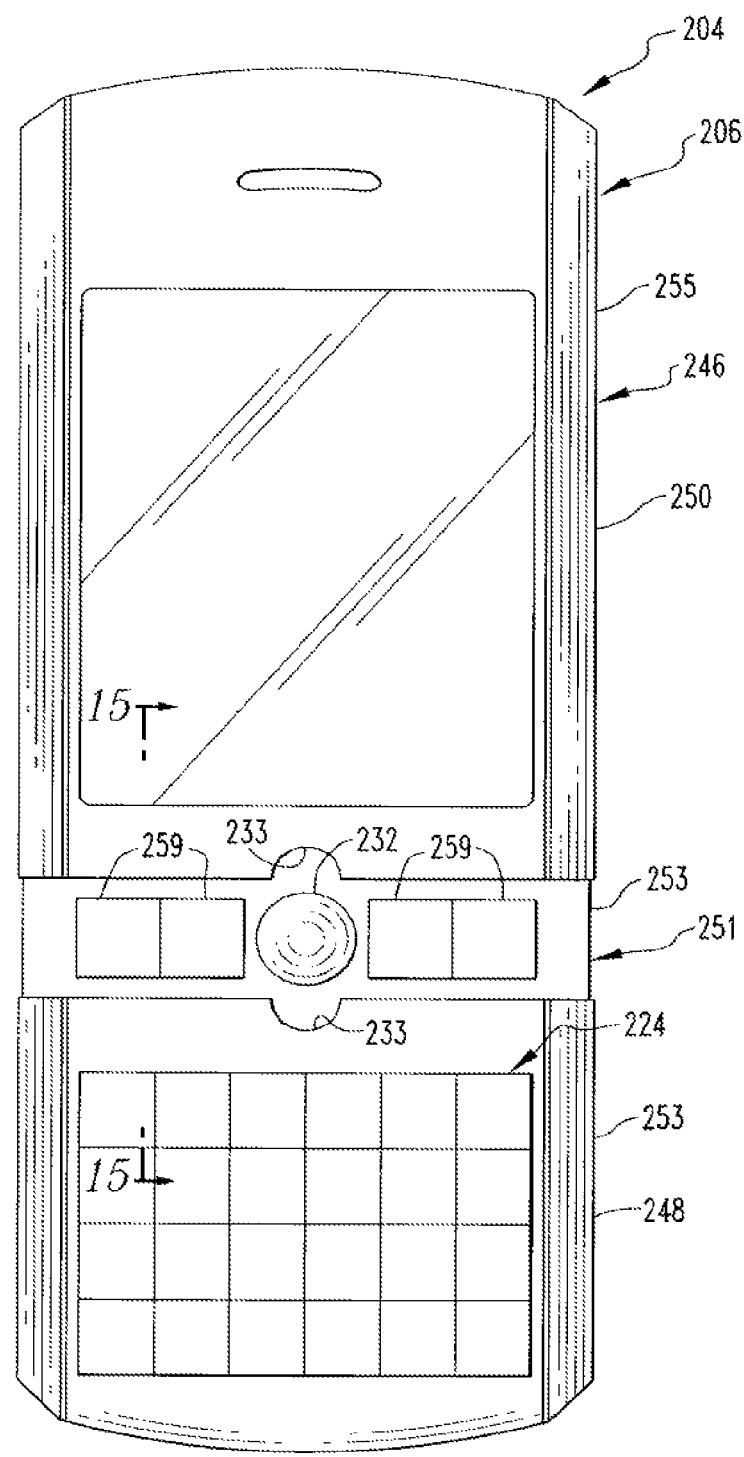
FIG. 14 is a front elevational view of the handheld electronic device of FIG. 13 in a deployed configuration.
Figure 15:
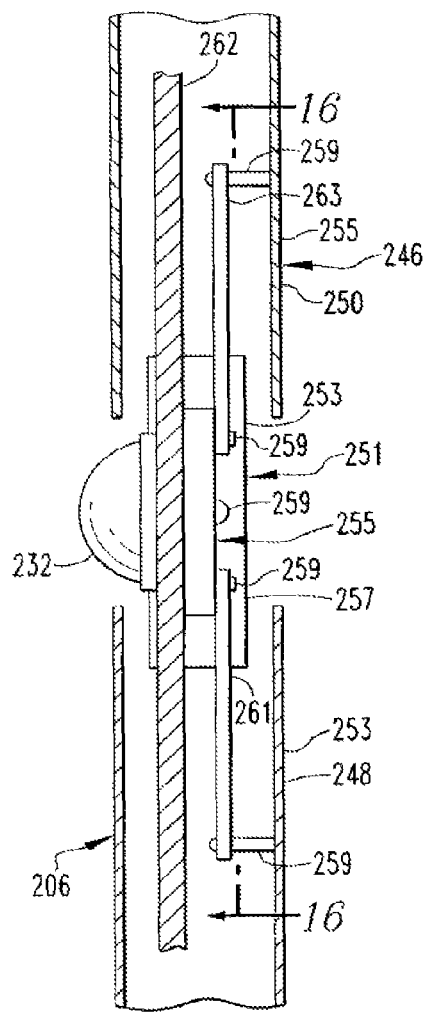
FIG. 15 is a sectional view as taken along line 15-15 of FIG. 14.
Figure 16:
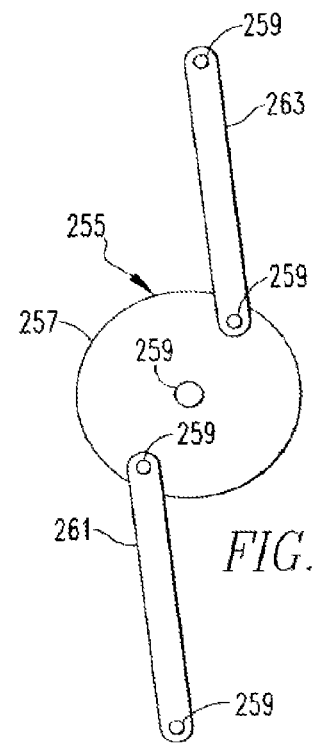
FIG. 16 is a partial sectional view as taken along line 16-16 of FIG. 15.
Figure 17:
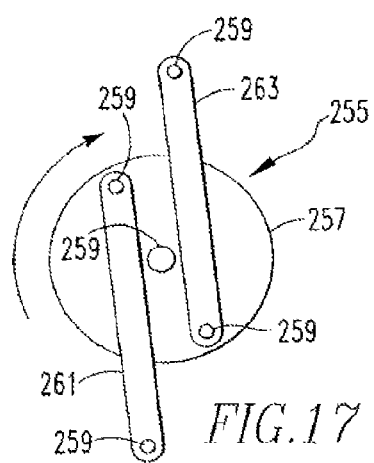
FIG. 17 is a view similar to FIG. 16, except depicting a portion of the handheld electronic device of FIG. 13 in the retracted configuration.

An improved handheld electronic device 204 in accordance with a third embodiment of the disclosed and claimed concept is depicted in FIGS. 13 and 14 and is depicted in part in FIGS. 15-17. The handheld electronic 204 is similar to the handheld electronic devices 4 and 104 except that it has a body 246 that is differently arranged. The handheld electronic device 204 is in its retracted configuration in FIG. 13 and is in its deployed configuration in FIG. 14. It can be understood from FIG. 13 that the track ball 232 protrudes at least partially through an aperture 233 in the housing 206 or is at least available therethrough when the handheld electronic device 204 in its retracted configuration. More specifically, the aperture 233 lies along a parting line 252 between a lower portion 253 of the housing 206 and an upper portion 255 of the housing 206. The lower portion 253 is a part of a bottom member 248 of the body 246, and the upper portion 255 is a part of a top member 250 of the body 246. It thus is understood that the track ball 232 is operable, at least in a minimal fashion, when the handheld electronic device 204 is in the retracted configuration.

The handheld electronic device 204 is further different from the handheld electronic devices 4 and 104 since the body 246 includes, in addition to the bottom and top members 248 and 250, a center member 251 to which the bottom and top members 248 and 250 are movably mounted. In moving from the retracted configuration to the deployed configuration, the bottom and top members 248 and 250 are translated away from one another along a common direction of travel. The bottom and top members 248 and 250 are disposed farther from one another in the deployed configuration than when in the retracted configuration.

As can be understood from FIG. 14, in the deployed configuration the track ball 232 is more fully revealed, and a plurality of secondary keys 259 are similarly revealed. The track ball 232 and the secondary keys 259 are all disposed on the center member 251 which serves as a retracting portion of the handheld electronic device 204.

As can be understood from FIGS. 14 and 15, the center member comprises a printed circuit board 262, a center portion 253 of the housing 206, and a mechanism 255 that mechanically extends between the bottom and top members 248 and 250 to regulate their movement with respect to the center member. As a general matter, it is understood that a significant portion of the heavier components of the handheld electronic device 204 are mounted to or are otherwise disposed on the printed circuit board 262. If the center member 251 could be considered to remain stationary and the bottom and top members 248 and 250 translating away from one another and from the center member 251 when moving from the retracted configuration toward the deployed configuration, it can be understood that the center of gravity of the handheld electronic device 204 remains largely unchanged between the retracted and deployed configurations. That is, by arranging the center member 251 to carry a significant portion of the weight of the handheld electronic device 204 and by arranging the bottom and top members 248 and 250 to each move away from the center member 251 in opposite directions therefrom, the center of gravity, and thus the weight distribution, of the handheld electronic device 204 is consistent between the retracted and deployed configurations.

In this regard, a consistent center of gravity between configurations makes the handheld electronic device 204 relatively easier to use than if the weight distribution of the handheld electronic device varied significantly between configurations. For instance, a keypad 224 of the handheld electronic device 204 might be operable in both the retracted and deployed configurations. The handheld electronic device 204 in the retracted configuration will have a certain feel in the hands of a user. If in the deployed configuration the weight distribution of the handheld electronic device 204 were to change in a significant fashion, the feel of the keypad 224 would similarly change and this would cause a distraction for the user. Advantageously, however, by arranging the handheld electronic device 204 to maintain a substantially unvarying center of gravity between configurations, needless distraction to the user is avoided and the handheld electronic device 204 has more of a high quality feel in the hands of a user than if its weight distribution were variable between configurations.

The aforementioned mechanism 255 mechanically connects together the bottom and top members 248 and 250 with one another and with the center member 251 to further retain a consistent center of gravity and to provide an even further improved feel in the hands of a user. In the exemplary embodiment depicted herein, the mechanism 255 comprises a crank 257 that is rotatably mounted to the printed circuit board 262 with a pin 259. The printed circuit board 262 thus serves as a base upon which the crank 257 is movably disposed. The mechanism 255 additionally includes a first link 261 and a second link 263 that are both connected with the crank 257 with additional pins 259. The first link 261 additionally is connected to the bottom member 248 with another pin 259, and the second link 263 is further connected with the top member 250 with still another pin 259.

FIG. 16 depicts the mechanism 255 when the handheld electronic device 204 is in the deployed configuration. The mechanism 255 is depicted in FIG. 17 when the handheld electronic device 204 is in the retracted configuration. It can be understood that the handheld electronic device 204 moving between the retracted and deployed configurations causes a pivoting of the crank 257 with respect to the printed circuit board 262 which carries the first and second links 261 and 263 therewith. In the exemplary embodiment depicted herein, therefore, the bottom and top members 248 and 250 move, i.e., translate, at the same velocity with respect to the center member 251. It is understood that if different rates of travel were desired, the first and second links 261 and 263 could be positioned differently on the crank 257. For instance, positioning the first and second links 261 and 263 at a different radii from the pivot point of the crank 257 would alter the velocity and/or the distance traveled by the bottom and top members 248 and 250.

It is understood that other types of mechanisms can be employed without departing from the present concept. For instance, a toothed pinion could be rotatably disposed on the printed circuit board 262 or other type of base of the center member 251, and separate racks of teeth could be mounted to each of the bottom and top members 248 and 250, with the racks and the pinion being operatively engaged. Other types of mechanisms will be apparent. It is understood, however, that in the absence of such a mechanism, the bottom and top members 248 and 250 could be free to move with respect to the center member 251 and not be constrained to move in the fashion mentioned above. Such a situation can exist within the disclosed and claimed concept.

Figure 18:
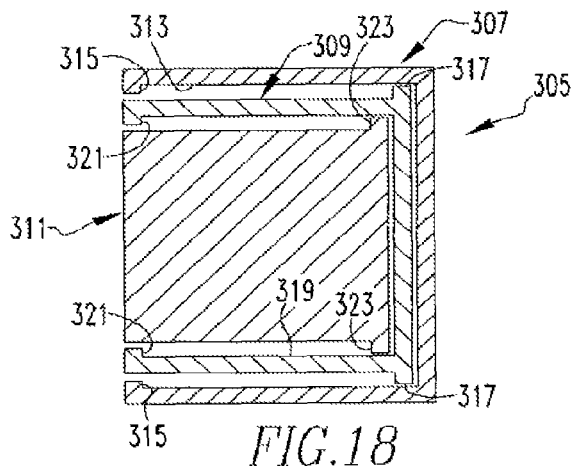
FIG. 18 is a schematic representation of a movement mechanism in accordance with the disclosed and claimed concept that can be incorporated into any of the handheld electronic devices herein in a retracted configuration.
Figure 19:
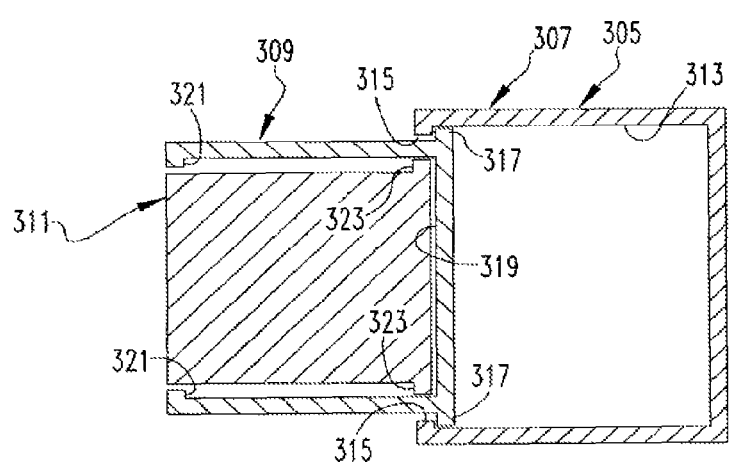
FIG. 19 is a view similar to FIG. 18 except depicting the movement mechanism in a first deployed configuration.
Figure 20:
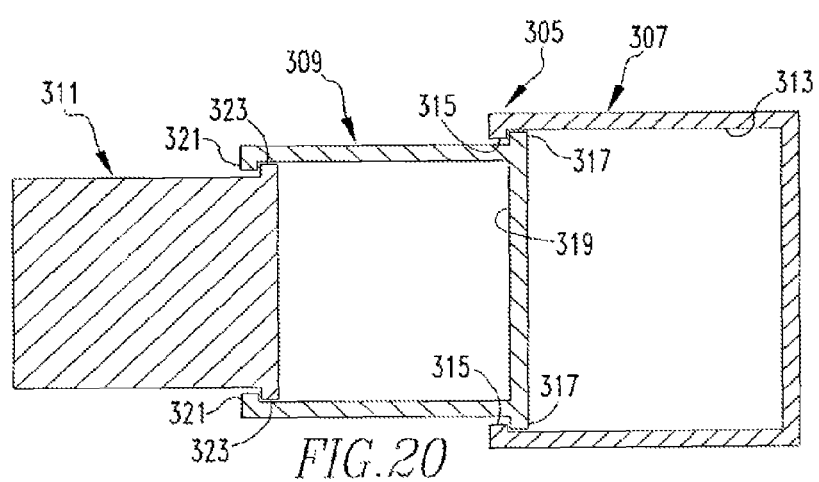
FIG. 20 is a view similar to FIG. 18 except depicting the movement mechanism in a second deployed configuration.

For instance, an alternate connector apparatus 305 is depicted in FIGS. 18-20. The connector apparatus 305 could be incorporated into the handheld electronic device 204 or could likewise be incorporated into the handheld electronic devices 4 and/or 104. The connector apparatus 305 comprises a first connector 307, a second connector 309, and a third connector 311 that are connected with one another in a telescoping arrangement. For example, the first connector 307 might be formed with an open region 313 that terminates at a pair of stops 315. In the fully retracted configuration the second and third connectors 309 and 311 can be telescopingly disposed within the open region 313.

The second connector 309 might be formed with a number of protrusions 317 that are engageable with the stops 315 when the connector apparatus 305 is in a first deployed configuration, such as is depicted generally in FIG. 19. Similarly, the second connector 309 might include its own open region 319 within which the third connector 311 can be disposed and can include its own stops 321 that engage with a number of protrusions 323 of the third connector 311 when the connector apparatus 305 is in a second deployed configuration, such as is depicted generally in FIG. 20.

Depending upon the arrangement of the connector apparatus 305, the first, second, and third connectors 307, 309, and 311 can move independently of one another among the retracted configuration, the first deployed configuration, and the second deployed configuration. Alternatively, the connector apparatus 305 might be arranged such that it moves from the retracted configuration to the first deployed configuration before thereafter moving to the second deployed configuration.

The connector apparatus 305 could be incorporated into the handheld electronic device 204, for example, such as by mounting the bottom member 248 to the first connector 307, mounting the top member 250 to the third connector 311, and by mounting the center member 251 to the second connector 309, although other mounting systems will be apparent. Such an arrangement potentially would permit the bottom and top members 248 and 250 to move freely with respect to the center member 251 and with respect to one another as suggested above, or such movement could be constrained in the other fashion mentioned above wherein the first deployed configuration must be reached before the connector apparatus 305 can move toward the second deployed configuration.

By way of example, it is noted that the connector apparatus 305 could be incorporated into the handheld electronic device 104 in order to provide the retracted, deployed, and overtravel configurations. For instance, the handheld electronic device 104 could be arranged such that its retracted configuration would be the retracted configuration of FIG. 18 and with the deployed configuration of the handheld electronic device 104 being the first deployed configuration of the connection apparatus 305 as is depicted in FIG. 19. Furthermore, the overtravel configuration of the handheld electronic device 104 could be the second deployed configuration of the connector apparatus 305, which is depicted generally in FIG. 20.

The handheld electronic devices 4, 104, and 204 each provide various features, and it is expressly noted that the various features of the handheld electronic devices 4, 104, and 204 can be combined with one another in unlimited combinations within the scope of the disclosed and claimed concept. As such, the specific embodiments describe herein and their specific combinations of features are not intended to be limiting in any fashion.

An exemplary home screen output that can be visually output on the display of any of the handheld electronic devices 4, 104, and 204 is depicted in FIG. 21 as including a plurality of icons 1062 that are selectable by the user for the purpose of, for example, initiating the execution on the processor apparatus 16 of a routine 44 that is represented by an icon 1062. The track ball is rotatable to provide, for example, navigational inputs among the icons 1062. It is noted that while some the following discussion may be expressed in terms of the handheld electronic device 4 for the sake of simplicity, it is understood that the discussion is equally applicable to the handheld electronic device 104 and 204, for example.

FIG. 21 depicts the travel of an indicator 1066 from the icon 1062A, as is indicated in broken lines with the indicator 1066A, to the icon 1062B, as is indicated in broken lines with the indicator 1066B, and onward to the icon 1062C, as is indicated by the indicator 1066C. It is understood that the indicators 1066A, 1066B, and 1066C are not necessarily intended to be simultaneously depicted on the display 18, but rather are intended to together depict a series of situations and to indicate movement of the indicator 1066 among the icons 1062. The particular location of the indicator 1066 at any given time indicates to a user the particular icon 1062, for example, that is the subject of a selection focus of the handheld electronic device 4. Whenever an icon 1062 or other selectable object is the subject of the selection focus, a selection input to the processor apparatus 16 will result in execution or initiation of the routine 44 or other function that is represented by the icon 1062 or other selectable object.

The movement of the indicator 1066 from the icon 1062A, as indicated with the indicator 1066A, to the icon 1062B, as is indicated by the indicator 1066B, was accomplished by rotating the track ball 32 about the vertical axis 34B to provide a horizontal navigational input. As mentioned above, a rotation of the track ball 32 a predetermined rotational distance results in an input to the processor apparatus 16. In the present example, the track ball 32 would have been rotated about the vertical axis 34B a rotational distance equal to three times the predetermined rotational distance since the icon 62B is disposed three icons 1062 to the right the icon 1062A. Such rotation of the track ball 32 likely would have been made in a single motion by the user, but this need not necessarily be the case.

Similarly, the movement of the indicator 1066 from the icon 1062B, as indicated by the indicator 1066B, to the icon 1062C, as is indicated by the indicator 1066C, was accomplished by the user rotating the track ball 32 about the horizontal axis 34A to provide a vertical navigational input. In so doing, the track ball 32 would have been rotated a rotational distance equal to two times the predetermined rotational distance since the icon 1062C is disposed two icons 1062 below the icon 1062B. Such rotation of the track ball 32 likely would have been made in a single motion by the user, but this need not necessarily be the case.

It thus can be seen that the track ball 32 is rotatable in various directions to provide various navigational and other inputs to the processor apparatus 16. Rotational inputs by the track ball 32 typically are interpreted by whichever routine 44 is active on the handheld electronic device 4 as inputs that can be employed by such routine 44. For example, the GUI 44 that is active on the handheld electronic device 4 in FIG. 21 requires vertical and horizontal navigational inputs to move the indicator 1066, and thus the selection focus, among the icons 1062. If a user rotated the track ball 32 about an axis oblique to the horizontal axis 34A and the vertical axis 34B, the GUI 44 likely would resolve such an oblique rotation of the track ball 32 into vertical and horizontal components which could then be interpreted by the GUI 44 as vertical and horizontal navigational movements, respectively. In such a situation, if one of the resolved vertical and horizontal navigational movements is of a greater magnitude than the other, the resolved navigational movement having the greater magnitude would be employed by the GUI 44 as a navigational input in that direction to move the indicator 1066 and the selection focus, and the other resolved navigational movement would be ignored by the GUI 44, for example.

When the indicator 1066 is disposed on the icon 1062C, as is indicated by the indicator 1066C, the selection focus of the handheld electronic device 4 is on the icon 1062C. As such, a translation of the track ball 32 toward the housing 6 as described above would provide an input to the processor apparatus 16 that would be interpreted by the GUI 44 as a selection input with respect to the icon 1062C. In response to such a selection input, the processor apparatus 16 would, for example, begin to execute a routine 44 that is represented by the icon 1062C. It thus can be understood that the track ball 32 is rotatable to provide navigational and other inputs in multiple directions, assuming that the routine 44 that is currently active on the handheld electronic device 4 can employ such navigational or other inputs in a plurality of directions, and can also be translated to provide a selection input or other input.

Figure 22:
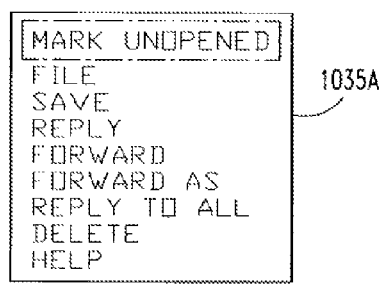
FIG. 22 depicts an exemplary menu that can be output on a handheld electronic device.
Figure 23:
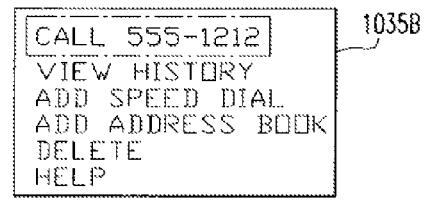
FIG. 23 depicts another exemplary menu.

As mentioned above, FIG. 22 depicts an exemplary menu 1035A that would be appropriate if the user's current logical location within the logical menu tree was viewing an email within an email routine 44. That is, the menu 1035A provides selectable options that would be appropriate for a user given that the user is, for example, viewing an email within an email routine 44. In a similar fashion, FIG. 23 depicts another exemplary menu 1035B that would be depicted if the user's current logical location within the logical menu tree was within a telephone routine 44.

Rotational movement inputs from the track ball 32 could be employed to navigate among, for example, the menus 1035A and 1035B. For instance, after an actuation of the <MENU> key 33 and an outputting by the GUI 44 of a resultant menu, the user could rotate the track ball 32 to provide scrolling inputs to successively highlight the various selectable options within the menu. Once the desired selectable option is highlighted, i.e., is the subject of the selection focus, the user could translate the track ball 32 toward the housing 6 to provide a selection input as to the highlighted selectable option. In this regard, it is noted that the <MENU> key 33 is advantageously disposed adjacent the track ball 32. This enables, for instance, the generation of a menu by an actuation the <MENU> key 33, conveniently followed by a rotation the track ball 32 to highlight a desired selectable option, for instance, followed by a translation of the track ball 32 toward the housing 6 to provide a selection input to initiate the operation represented by the highlighted selectable option.

It is further noted that one of the additional inputs that can be provided by a translation of the track ball 32 is an input that causes the GUI 44 to output a reduced menu. For instance, a translation of the track ball 32 toward the housing 6 could result in the generation and output of a more limited version of a menu than would have been generated if the <MENU> key 33 had instead been actuated. Such a reduced menu would therefore be appropriate to the user's current logical location within the logical menu tree and would provide those selectable options which the user would have a high likelihood of selecting. Rotational movements of the track ball 32 could provide scrolling inputs to scroll among the selectable options within the reduced menu 1035C, and translation movements of the track ball 32 could provide selection inputs to initiate whatever function is represented by the selectable option within the reduce menu 1035C that is currently highlighted.

Figure 24:
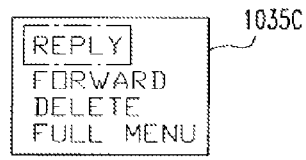
FIG. 24 depicts an exemplary reduced menu.

By way of example, if instead of actuating the <MENU> key 33 to generate the menu 1035A the user translated the track ball 32, the GUI 44 would generate and output on the display the reduced menu 1035C that is depicted generally in FIG. 24. The exemplary reduced menu 1035C provides as selectable options a number of the selectable options from the menu 1035A that the user would be most likely to select. As such, a user seeking to perform a relatively routine function could, instead of actuating the <MENU> key 33 to display the full menu 1035A, translate the track ball 32 to generate and output the reduced menu 1035C. The user could then conveniently rotate the track ball 32 to provide scrolling inputs to highlight a desired selectable option, and could then translate the track ball 32 to provide a selection input which would initiate the function represented by the selectable option in the reduced menu 1035C that is currently highlighted.

In the present exemplary embodiment, many of the menus that could be generated as a result of an actuation of the <MENU> key 33 could instead be generated and output in reduced form as a reduced menu in response to a translation of the track ball 32 toward the housing 6. It is noted, however, that a reduced menu might not be available for each full menu that could be generated from an actuation of the <MENU> key 33. Depending upon the user's specific logical location within the logical menu tree, a translation of the track ball 32 might be interpreted as a selection input rather than an input seeking a reduced menu. For instance, a translation of the track ball 32 on the home screen depicted in FIG. 1 would result in a selection input as to whichever of the icons 1062 is the subject of the input focus. If the <MENU> key 33 was actuated on the home screen, the GUI 44 would output a menu appropriate to the home screen, such as a full menu of all of the functions that are available on the handheld electronic device 4, including those that might not be represented by icons 1062 on the home screen.

Figure 25:
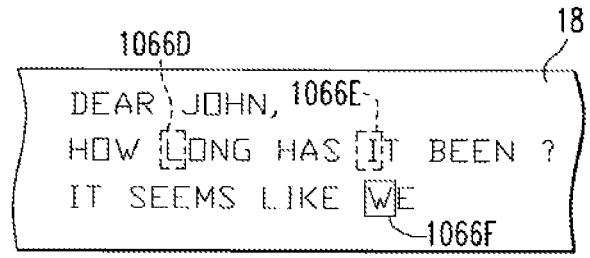
FIG. 25 is an output such as could occur during another exemplary text entry or text editing operation.

FIG. 25 depicts a quantity of text that is output on the display 18, such as during a text entry operation or during a text editing operation, for example. The indicator 1066 is depicted in FIG. 25 as being initially over the letter "L", as is indicated with the indicator 1066D, and having been moved horizontally to the letter "I", as is indicated by the indicator 1066E, and thereafter vertically moved to the letter "W", as is indicated by the indicator 1066F. In a fashion similar to that in FIG. 21, the cursor 1066 was moved among the letters "L", "I", and "W" through the use of horizontal and vertical navigational inputs resulting from rotations of the track ball 32. In the example of FIG. 25, however, each rotation of the track ball 32 the predetermined rotational distance would move the indicator 1066 to the next adjacent letter. As such, in moving the indicator 1066 between the letters "L" and "I," the user would have rotated the track ball 32 about the vertical axis 1034B a rotational distance equal to nine times the predetermined rotational distance, for example, since "I" is disposed nine letters to the right of "L".

Figure 26:
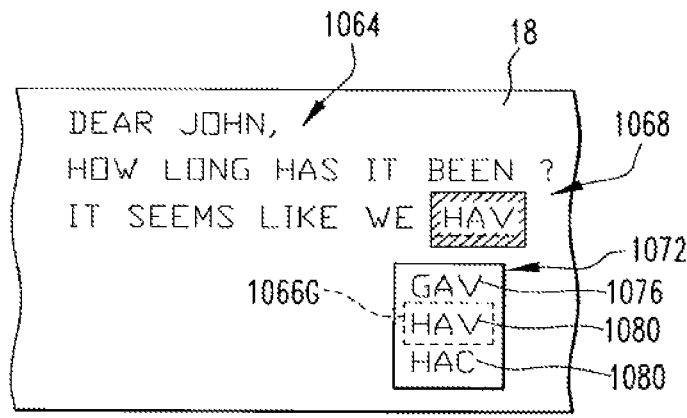
FIG. 26 is an output during another exemplary text entry operation.

FIG. 26 depicts an output 1064 on the display 18 during, for example, a text entry operation that employs the disambiguation routine 44. The output 1064 can be said to comprise a text component 1068 and a variant component 1072. The variant component 1072 comprises a default portion 1076 and a variant portion 1080. FIG. 26 depicts the indicator 1066G on the variant 1080 "HAV", such as would result from a rotation of the track ball 32 about the horizontal axis 34A to provide a downward vertical scrolling input. In this regard, it is understood that a rotation of the track ball 32 a distance equal to the predetermined rotational distance would have moved the indicator 1066 from a position (not expressly depicted herein) disposed on the default portion 1076 to the position disposed on the first variant 1080, as is depicted in FIG. 26. Since such a rotation of the track ball 32 resulted in the first variant 1080 "HAV" being highlighted with the indicator 1066G, the text component 1068 likewise includes the text "HAV".

Figure 27:
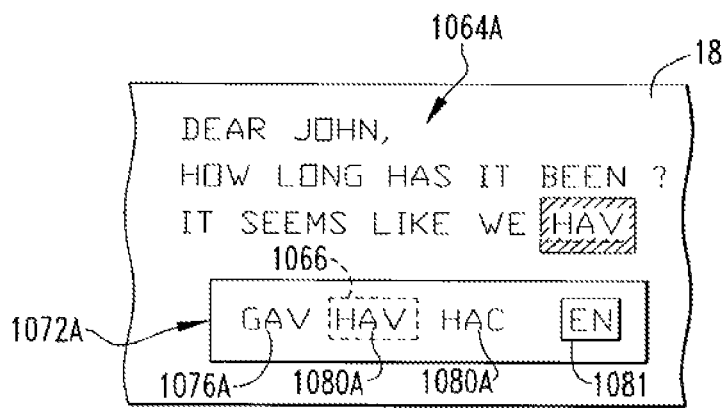
FIG. 27 is an alternative output during the exemplary text entry operation of FIG. 26.

FIG. 27 depict an alternative output 1064A having an alternative variant component 1072A having a default portion 1076A and a variant portion 1080A. The variant component 1072A is horizontally arranged, meaning that the default portion 1076A and the variants 1080A are disposed horizontally adjacent one another and can be sequentially selected by the user through the use of horizontal scrolling inputs, such as by the user rotating the track ball 32 the predetermined rotational distance about the vertical axis 34B. This is to be contrasted with the variant component 1072 of FIG. 26 wherein the default portion 1076 and the variants 1080 are vertically arranged, and which can be sequentially selected by the user through the user of vertical scrolling inputs with the track ball 32.

In this regard, it can be understood that the track ball 32 can provide both the vertical scrolling inputs employed in conjunction with the output 1064 as well as the horizontal scrolling inputs employed in conjunction with the output 1064A. For instance, the disambiguation routine 44 potentially could allow the user to customize the operation thereof by electing between the vertically arranged variant component 1072 and the horizontally arranged variant component 1072A. The track ball 32 can provide scrolling inputs in the vertical direction and/or the horizontal direction, as needed, and thus is operable to provide appropriate scrolling inputs regardless of whether the user chooses the variant component 1072 or the variant component 1072A. That is, the track ball 32 can be rotated about the horizontal axis 34A to provide the vertical scrolling inputs employed in conjunction with the variant component 1072, and also can be rotated about the vertical axis 34B to provide the horizontal scrolling inputs that are employed in conjunction with the variant component 1064A. The track ball 32 thus could provide appropriate navigational, strolling, selection, and other inputs depending upon the needs of the routine 44 active at any time on the handheld electronic device 4. The track ball 32 enables such navigational, strolling, selection, and other inputs to be intuitively generated by the user through rotations of the track ball 32 in directions appropriate to the active routine 44, such as might be indicated on the display 18.

It can further be seen from FIG. 27 that the variant component 1072A additionally includes a value 1081 that is indicative of the language into which the disambiguation routine 44 will interpret ambiguous text input. In the example depicted in FIG. 27, the language is English.

Figure 28:
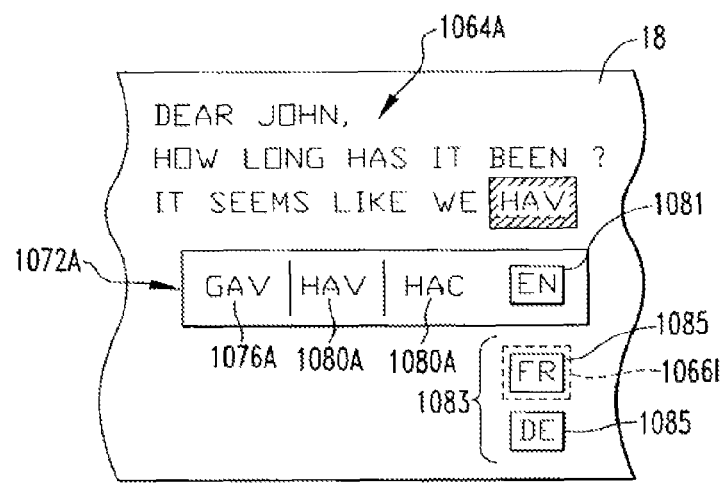
FIG. 28 is another output during another part of the exemplary text entry operation of FIG. 26.

As can be seen in FIG. 28, the value 1081 can be selected by the user to cause the displaying of a list 1083 of alternative values 1085. The alternative values 1085 are indicative of selectable alternative languages into which the disambiguation routine 44 can interpret ambiguous input. A selection of the value 1081 would have been achieved, for example, by the user providing horizontal scrolling inputs with the track ball 32 to cause (not expressly depicted herein) the indicator 1066 to be disposed over the value 1081, and by thereafter translating the track ball 32 toward the housing 6 to provide a selection input.

The alternative values 1085 in the list 1083 are vertically arranged with respect to one another and with respect to the value 1081. As such, a vertical scrolling input with the track ball 32 can result in a vertical movement of the indicator 10661 to a position on one of the alternative values 1085 which, in the present example, is the alternative value 1085 "FR", which is representative of the French language. The alternative value 1085 "FR" could become selected by the user in any of a variety of fashions, such as by actuating the track ball 32 again, by continuing to enter text, or in other fashions. It thus can be understood from FIG. 27 and FIG. 28 that the track ball 32 can be rotated to provide horizontal scrolling inputs and, when appropriate, to additionally provide vertical scrolling inputs and, when appropriate, to additionally provide selection inputs, for example.

Figure 29:
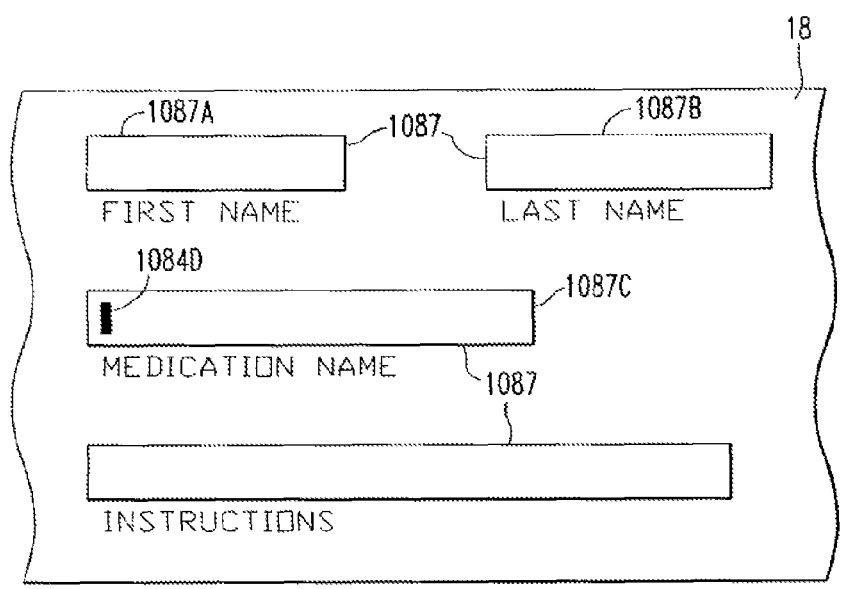
FIG. 29 is an exemplary output during a data entry operation.

FIG. 29 depicts another exemplary output on the display 18 such as might be employed by a data entry routine 44. The exemplary output of FIG. 29 comprises a plurality of input fields 1087 with corresponding descriptions. A cursor 1084D, when disposed within one of the input fields 1087, indicates to the user that an input focus of the handheld electronic device 4 is on that input field 1087. That is, data such as text, numbers, symbols, and the like, will be entered into whichever input field 1087 is active, i.e., is the subject of the input focus. It is understood that the handheld electronic device 4 might perform other operations or take other actions depending upon which input field 1087 is the subject of the input focus.

Navigational inputs from the track ball 32 advantageously enable the cursor 1084D, and thus the input focus, to be switched, i.e., shifted, among the various input fields 1087. For example, the input fields 1087 could include the input fields 1087A, 1087B, and 1087C. FIG. 29 depicts the cursor 1084D as being disposed in the input field 1087C, indicating that the input field 1087C is the subject of the input focus of the handheld electronic device 4. It is understood that the cursor 1084D, and thus the input focus, can be shifted from the input field 1087C to the input field 1087A, which is disposed adjacent and vertically above the input field 1087C, by providing a vertical scrolling input in the upward direction with the track ball 32. That is, the track ball 32 would be rotated the predetermined rotational distance about the horizontal axis 34. Similarly, the cursor 1084D, and thus the input focus, can be shifted from the input field 1087A to the input field 1087B, which is disposed adjacent and to the right of the input field 1087A, by providing a horizontal scrolling input to the right with the track ball 32. That is, such a horizontal scrolling input could be provided by rotating the track ball the predetermined rotational distance about the vertical axis 34B. It thus can be seen that the track ball 32 is rotatable in a plurality of directions about a plurality axes to provide navigational, scrolling, and other inputs in a plurality of directions among a plurality of input fields 1087. Other types of inputs and/or inputs in other applications will be apparent.

Figure 30:
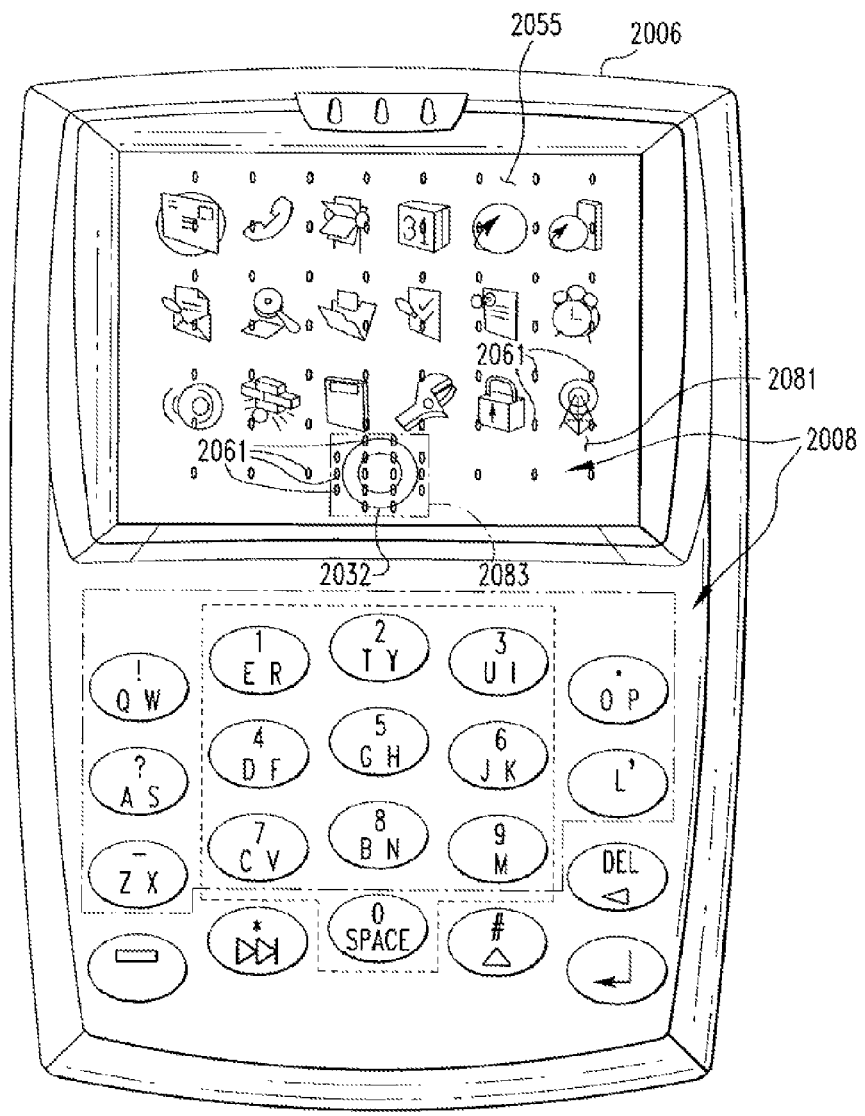
FIG. 30 is a top plan view of an improved handheld electronic device in accordance with another embodiment of the disclosed concept.
Figure 31:
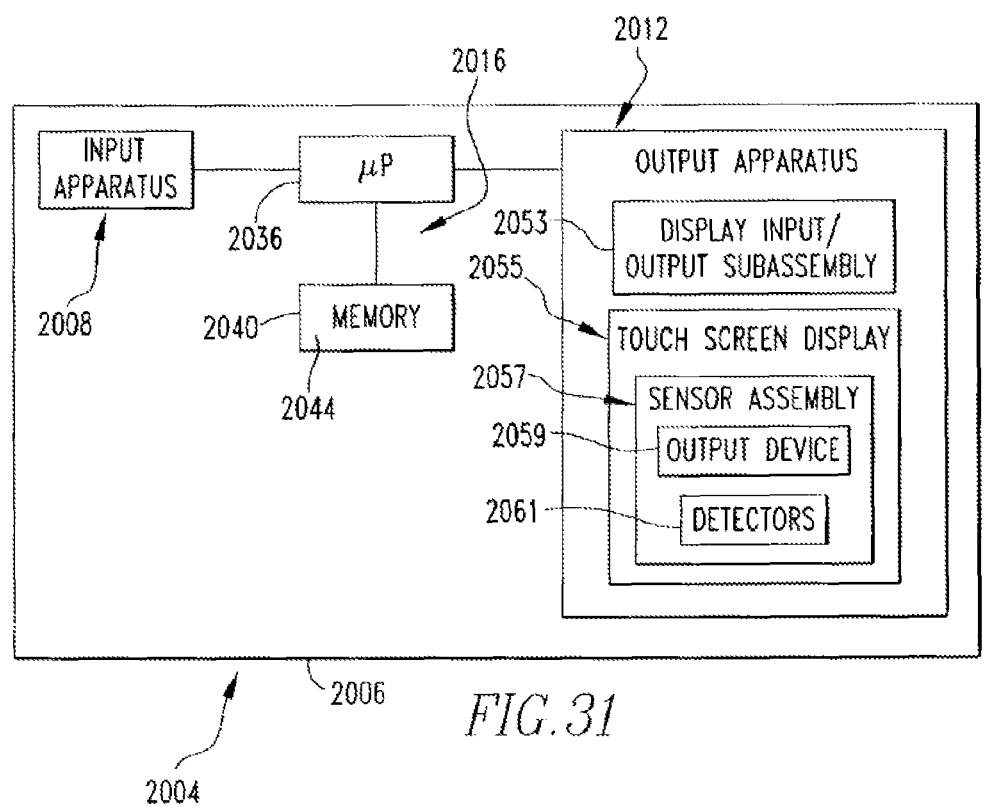
FIG. 31 is a schematic depiction of the handheld electronic device of FIG. 30.

An improved handheld electronic device 2004 in accordance with still another embodiment of the disclosed and claimed concept is depicted generally in FIG. 30 and FIG. 31. The handheld electronic device 2004 includes a housing 2006 upon which are disposed an input apparatus 2008, an output apparatus 2012, and a processor apparatus 2016. The processor apparatus 2016 comprises a processor 2036 and a memory 2040 having stored therein a number of routines 2044. All of the operations that can be performed on or with the handheld electronic device 4 can be performed on or with the handheld electronic device 2004. As such, the features of the handheld electronic device 2004 that are common with the handheld electronic device 4, and this would comprise essentially all of the features of the handheld electronic device 4, will generally not be repeated.

As a general matter, the handheld electronic device 2004 is substantially identical in arrangement and function to the handheld electronic device 4, except that the handheld electronic device 2004 includes a touch screen display 2055 that provides a non-mechanical multiple-axis input device 2032 instead of the track ball 32. The non-mechanical multiple-axis input device 2032 can be said to be in the form of a virtual track ball 2032.

As is generally understood, the touch screen display 2055 includes a liquid crystal layer between a pair of substrates, with each substrate including an electrode. The electrodes form a grid which defines the aperture size of the pixels. When a charge is applied to the electrodes, the liquid crystal molecules of the liquid crystal layer become aligned generally perpendicular to the two substrates. A display input/ output subassembly 2053 of the output apparatus 2012 controls the location of the charge applied to the electrodes thereby enabling the formation of images on the touch screen display 2055.

Additionally, the touch screen display 2055 comprises a sensor assembly 2057 which comprises an output device 2059 and a plurality of detectors 2061. The detectors 2061 are shown schematically and are typically too small to be seen by the naked eye. Each detector 2061 is in electrical communication with the output device 2059 and creates an output signal when actuated. The detectors 2061 are disposed in a pattern, discussed below, and are structured to detect an external object immediately adjacent to, or touching, the touch screen display 2055. The external object is typically a stylus or a user's finger (not shown). The output device 2059 and/or the processor 2016 are structured to receive the detector signals and convert the signals to data representing the location of the external object relative to the touch screen display 2055. As such, while the sensor assembly 2057 is physically a component of the touch screen display 2055, it is nevertheless considered to be a logical component of the input apparatus 2008 since it provides input to the processor apparatus.

The detectors 2061 are typically capacitive detectors, optical detectors, resistive detectors, or mechanical detectors such as strain gauge or charged grid, although other technologies may be employed without departing from the present concept. Typically, capacitive detectors are structured to detect a change in capacitance caused by the electrical field of the external object or a change in capacitance caused by the compression of the capacitive detector. Optical detectors are structured to detect a reflection of light, e.g., light created by the touch screen display 2055. Mechanical detectors include a charged grid with columns that would be disposed on one side of the touch screen display 2055 and a corresponding grid without columns would be disposed at another location on the touch screen display 2055. In such an arrangement, when the touch screen display 2055 is compressed, i.e. as a result of being touched by the user, the columns at the area of compression contact the opposing grid thereby completing a circuit.

Capacitive detectors may be disposed upon either substrate and, although small, require space. Thus, and any pixel that is disposed adjacent a detector 2061 will have a reduced size, or aperture, to accommodate the adjacent detector 2061.

The detectors 2061 are disposed in a pattern, and at least some of the detectors 2061 preferably are arranged in lines that form a grid. A first portion of the detectors 2061 are disposed on a first area 2081 of the touch screen display 2055, and a second portion of the detectors 2061 are disposed on a second area 2083 of the touch screen display 2055. As can be seen from FIG. 30, the first area 2081 essentially is every region of the touch screen display 2005 other than the second area 2083.

The first portion of the detectors 2061 disposed on the first area 2081 of the touch screen display 2055 are disposed in a relatively sparse pattern in order to minimize the visual interference that is caused by the presence of the detectors 2061 adjacent the pixels. Preferably, the spacing of the detectors 2061 on the first area 2081 is between about 1.0 mm and 10.0 mm between the detectors 2061, and more preferably about 3.0 mm between the detectors 2061.

The second portion of the detectors 2061 are disposed in a relatively dense pattern on the second area 2083 of the touch screen display 2055 and are structured to support the function of the virtual track ball 2032. The image quality in the second area 2083 of the touch screen display 2055 is adversely affected due to the dense spacing of the detectors 2061 there. However, the second area 2083 is a relatively small area compared to the entire touch screen display 2055. Preferably, the density of the detectors 2061 in the second area 2083 is between about 0.05 mm and 3.0 mm between the detectors, and more preferably about 0.1 mm between the detectors 2061. Further, because the pixels in the second area 2083 are dedicated for the virtual track ball 2032, it is acceptable to have a reduced pixel density with larger pixels. Since the pixel size would be very large, the aspect ratio would be significantly higher than that of pixels that are not disposed adjacent a detector 2061. The pixels in the second area 2083 likely would be special function pixels, such as pixels that would both depict the virtual track ball 2032 and that would light up the second area 2083 to highlight the virtual track ball 2032.

The processor apparatus is structured to create images and define the boundaries of selectable portions of the images on the touch screen display 2055. For example, the processor apparatus will create the images of selectable icons or other objects on specific portions of the touch screen display 2055. The processor apparatus is further structured to relate specific detectors 2061 to the specific portions of the touch screen display 2055. Thus, when the processor apparatus detects the actuation of a specific detector 2061 adjacent to a specific image, e.g. a selectable icon, the processor apparatus will initiate the function or routine related to that icon, e.g. opening a calendar program.

Similarly, the processor apparatus is structured to employ specific detectors 2061 to support the function of the virtual track ball 2032 in the second area 2083 of the touch screen display 2055. Thus, actuations of one or more of the detectors 2061 that support the virtual track ball 2032 will be interpreted by the processor apparatus as being inputs from the virtual track ball 2032. For instance, an actuation of a sequential plurality of detectors 2061 extending along a particular direction on the touch screen display 2055 in the second area 2083 might be interpreted as a navigational input, a scrolling input, a selection input, and/or another input in the particular direction. Since the user can freely move a finger, for instance, in any direction on the touch screen display 2055, the virtual track ball 2032 is a multiple-axis input device. Other inputs, such as a non-moving actuation of one or more detectors 2061 in the central region of the virtual track ball 2032 could be interpreted by the processor apparatus as an actuation input of the virtual track ball 2032, such as would be generated by an actuation of the track ball 32 of the handheld electronic device 1004 in a direction toward the housing 1006 thereof. It can be understood that other types of actuations of the detectors 2061 in the second area 2083 can be interpreted as various other inputs without departing from the disclosed and claimed concept.

The handheld electronic device 2004 thus comprises a multiple-axis input device 2032 that is non-mechanical but that still provides the same functional features and advantages as, say, the track ball 32 of the handheld electronic device 4. It is understood that the virtual track ball 2032 is but one example of the many types of multiple-axis input devices that could be employed on the handheld electronic device 2004.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A handheld electronic device comprising:
a processor apparatus comprising a processor and a memory;
an input apparatus structured to provide input to the processor apparatus and comprising a keypad that comprises a total number of actuators;
an output apparatus structured to receive output signals from the processor apparatus, at least a portion of each of the processor apparatus, the input apparatus, and the output apparatus together forming a body that comprises a first member and a second member, the first member and the second member being movable with respect to each other, along an axis, between a first configuration of the body and a second configuration of the body, the total number of actuators being exposed in both the first configuration and the second configuration; and
a sensor apparatus mounted on the body, the sensor apparatus being operationally connected to the processor apparatus, the sensor apparatus to sense when the body is in the first configuration and when the body is in the second configuration,
in the first configuration, the sensor apparatus to indicate to the processor apparatus that the body is in the first configuration, the processor apparatus to ignore an input from any of the total number of actuators when any of the total number of actuators has an actuating force applied thereto,
in the second configuration the sensor apparatus to indicate to the processor apparatus that the body is in the second configuration, the processor apparatus to process an input from any of the total number of actuators when any of the total number of actuators has an actuating force applied thereto.

2. The handheld electronic device of claim 1 wherein the sensor apparatus comprises a first Hall effect sensor, a second Hall effect sensor, and a magnet, the first Hall effect sensor and the second Hall effect sensor being operationally connected to the processor apparatus.

3. The handheld electronic device of claim 2 wherein, when the body is in the first configuration, the first Hall effect sensor and the magnet are aligned with respect to each other and the first Hall effect sensor provides an input signal to the processor apparatus to indicate that the body is in the first configuration.

4. The handheld electronic device of claim 2 wherein, when the body is in the second configuration, the second Hall effect sensor and the magnet are aligned with respect to each other and the second Hall effect sensor provides an input signal to the processor apparatus to indicate that the body is in the second configuration.

5. The handheld electronic device of claim 2 further comprising a printed circuit board, the printed circuit board being fixed with respect to one of the first member and the second member, the first Hall effect sensor and the second Hall effect sensor being secured to the printed circuit board.

6. The handheld electronic device of claim 5 wherein the magnet is fixed with respect to the other of the first member and the second member.

7. The handheld electronic device of claim 1 wherein the first configuration is a retracted configuration and the second configuration is a deployed configuration.

8. The handheld electronic device of claim 1 further comprising:
a holder defined by one of the first member and the second member, the holder being structured to receive an object therein, the body in the first configuration being structured to resist removal of the object from the holder, the body in the second configuration being structured to permit removal of the object from the holder.

9. The handheld electronic device of claim 8 wherein the holder has a receiving section into which at least portion of the object is receivable, in the first configuration at least a portion of the other of the first member and the second member extending across at least a portion of the receiving section, in the second configuration the receiving section being fully exposed.

10. The handheld electronic device of claim 8 wherein the holder is a push-push holder.

11. A handheld electronic device comprising:
a body having a first member and a second member, the first member and the second member being movable with respect to each other, along an axis, between a first configuration of the body and a second configuration of the body;
a processor apparatus located in the body, the processor apparatus comprising a processor and a memory;
an input apparatus formed on the body and structured to provide input to the processor apparatus, the input apparatus having a keypad that comprises a total number of actuators, the total number of actuators being exposed in both the first configuration and the second configuration;
an output apparatus formed on the body and structured to receive output signals from the processor apparatus; and
a sensor apparatus mounted on the body, the sensor apparatus being operationally connected to the processor apparatus, the sensor apparatus to sense when the body is in the first configuration and when the body is in the second configuration,
in the first configuration, the sensor apparatus to indicate to the processor apparatus that the body is in the first configuration, the processor apparatus to ignore an input from any of the total number of actuators when any of the total number of actuators has an actuating force applied thereto,
in the second configuration the sensor apparatus to indicate to the processor apparatus that the body is in the second configuration, the processor apparatus to process an input from any of the total number of actuators when any of the total number of actuators has an actuating force applied thereto.

12. The handheld electronic device of claim 11 wherein the first member and the second member are movable to with respect to each other, along the axis, between the second configuration and a third configuration, the third configuration being an overtravel configuration wherein the first member and the second member are deployed further apart than in the second configuration, the handheld electronic device having a battery, the third configuration to allow access to the battery.

13. The handheld electronic device of claim 11 wherein the sensor apparatus comprises a first Hall effect sensor, a second Hall effect sensor, and a magnet, the first Hall effect sensor and the second Hall effect sensor being operationally connected to the processor apparatus.

14. The handheld electronic device of claim 13 wherein, when the body is in the first configuration, the first Hall effect sensor and the magnet are aligned with respect to each other and the first Hall effect sensor provides an input signal to the processor apparatus to indicate that the body is in the first configuration.

15. The handheld electronic device of claim 13 wherein, when the body is in the second configuration, the second Hall effect sensor and the magnet are aligned with respect to each other and the second Hall effect sensor provides an input signal to the processor apparatus to indicate that the body is in the second configuration.

16. The handheld electronic device of claim 13 further comprising a printed circuit board, the printed circuit board being fixed with respect to one of the first member and the second member, the first Hall effect sensor and the second Hall effect sensor being secured to the printed circuit board.

17. The handheld electronic device of claim 16 wherein the magnet is fixed with respect to the other of the first member and the second member.

\* \* \* \* \*